(12) United States Patent
Zhou et al.

(10) Patent No.: US 11,824,711 B2
(45) Date of Patent: Nov. 21, 2023

(54) TECHNIQUES FOR CONFIGURING A TIME GAP FOR A PROBING PULSE SIGNAL

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/016,658

(22) Filed: Sep. 10, 2020

(65) Prior Publication Data

US 2021/0092013 A1 Mar. 25, 2021

Related U.S. Application Data

(60) Provisional application No. 62/905,584, filed on Sep. 25, 2019.

(51) Int. Cl.
*H04L 41/0816* (2022.01)
*H04W 4/029* (2018.01)
(Continued)

(52) U.S. Cl.
CPC .......... *H04L 41/0816* (2013.01); *H04L 43/12* (2013.01); *H04W 4/029* (2018.02); *H04W 72/20* (2023.01)

(58) Field of Classification Search
CPC ........ G01S 13/42; G01S 13/46; G01S 13/765; G01S 13/878; G01S 2013/466;
(Continued)

(56) References Cited

U.S. PATENT DOCUMENTS

2008/0204322 A1* 8/2008 Oswald ..................... G01S 5/04
342/465
2009/0196249 A1* 8/2009 Kawamura .......... H04B 1/7143
370/329
(Continued)

FOREIGN PATENT DOCUMENTS

WO WO-2017207041 A1 12/2017

OTHER PUBLICATIONS

Partial International Search Report—PCT/US2020/050364—ISA/EPO—dated Dec. 10, 2020.
(Continued)

*Primary Examiner* — Omer S Mian
(74) *Attorney, Agent, or Firm* — Dalei Dong; Holland & Hart LLP

(57) ABSTRACT

Methods, systems, and devices for wireless communications are described. A device may transmit, to a set of receiving devices, a configuration for probing a location of an object. The configuration may include a timing gap associated with at least one transmission window and a reception window for a probing pulse signal, and the configuration may indicate for the set of devices to suspend wireless communications during the timing gap to receive a reflection of the probing pulse signal. The device may transmit the probing pulse signal to the object during the transmission window. The device may receive the reflection of the probing pulse signal from the object during the reception window. In some cases, the device may update a communication configuration for the object, or another device associated with the object, based on the reflection of the probing pulse signal.

30 Claims, 13 Drawing Sheets

(51) Int. Cl.
*H04L 43/12* (2022.01)
*H04W 72/20* (2023.01)

(58) Field of Classification Search
CPC ............... G01S 2013/468; G01S 7/006; H04L 41/0806; H04L 41/0816; H04L 41/12; H04L 43/0864; H04L 43/10; H04L 43/12; H04W 4/02; H04W 4/029; H04W 64/00; H04W 72/0406
See application file for complete search history.

(56) References Cited

U.S. PATENT DOCUMENTS

| | | | |
|---|---|---|---|
| 2019/0273550 A1* | 9/2019 | Li | H04L 27/2602 |
| 2019/0293781 A1* | 9/2019 | Bolin | G01S 13/86 |
| 2020/0120556 A1* | 4/2020 | Gargaro | H04W 36/26 |
| 2020/0191943 A1* | 6/2020 | Wu | G01S 13/726 |
| 2020/0319327 A1* | 10/2020 | Tsvelykh | G01S 7/023 |
| 2020/0333456 A1* | 10/2020 | Ying | G01S 13/86 |
| 2021/0152302 A1* | 5/2021 | Kwak | H04W 72/1231 |
| 2021/0176655 A1* | 6/2021 | Qi | H04W 40/24 |
| 2021/0231771 A1* | 7/2021 | Bengtsson | H04B 7/088 |
| 2021/0315020 A1* | 10/2021 | Jiang | H04B 7/0695 |

OTHER PUBLICATIONS

International Search Report and Written Opinion—PCT/US2020/050364—ISA/EPO—dated Feb. 1, 2021.

* cited by examiner

TECHNIQUES FOR CONFIGURING A TIME GAP FOR A PROBING PULSE SIGNAL

CROSS REFERENCE

The present application for patent claims the benefit of U.S. Provisional Patent Application No. 62/905,584 by ZHOU et al., entitled "TECHNIQUES FOR CONFIGURING A TIME GAP FOR A PROBING PULSE SIGNAL," filed Sep. 25, 2019, assigned to the assignee hereof, and which is hereby incorporated by reference in its entirety.

BACKGROUND

The following relates to wireless communications, and more specifically to techniques for configuring a time gap for a probing pulse signal.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may track a location of a UE. The base station may select cell and beam configurations for the UE based on positioning information of the UE. Some techniques for tracking a location of a UE can be improved.

SUMMARY

The described techniques relate to improved methods, systems, devices, and apparatuses that support techniques for configuring a time gap for a probing pulse signal. For example, the described techniques provide for identifying a location of a user equipment (UE). A base station providing a serving cell for UE may track the location of the UE. As the UE moves within a wireless communications system, the base station may implement techniques to locate the UE. The base station may transmit a probing pulse signal to the UE, which may reflect off the UE and be measured by the base station and one or more other devices. The devices may estimate the location of the UE based on arrival latency of the reflection or an arrival angle of the reflection and provide these estimates to the base station. The base station may then make a location estimate of the UE based on the multiple location estimates.

To support these techniques, the transmitting and receiving devices may be configured to suspend communications. For example, the devices may cease wireless communications for a timing gap, during which the base station may transmit the probing pulse signal, and the receiving devices may monitor for and receive respective reflected signals. The base station may configure the timing gap. For example, the base station may transmit the configuration to a set of devices configured to receive the reflection, to other devices configured to also transmit a probing pulse signal, and to the device or object reflecting the probing pulse signal. The configuration of the timing gap may specify a probing pulse transmission pattern. For example, the configuration may include a timing gap configuration, a pulse signal configuration, a configuration for each pulse transmit occasion in the timing gap, and a pulse occasion hopping pattern in the timing gap. The timing gaps may be configured to be periodic, semi-persistent, or aperiodic. The techniques described herein may be implemented by a UE or a base station. For example, the techniques may be applied in a device-to-device (D2D) system. For example, a UE may transmit the probing pulse signal, which may be reflected and measured by other UEs.

A method of wireless communications is described. The method may include transmitting, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmitting the probing pulse signal to the object during the transmission window based on the configuration, receiving the reflection of the probing pulse signal from the object during the reception window based on transmitting the probing pulse signal, and updating a communication configuration for a device associated with the object based on the reflection of the probing pulse signal.

An apparatus for wireless communications is described. The apparatus may include a processor, memory coupled with the processor, and instructions stored in the memory. The instructions may be executable by the processor to cause the apparatus to transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmit the probing pulse signal to the object during the transmission window based on the configuration, receive the reflection of the probing pulse signal from the object during the reception window based on transmitting the probing pulse signal, and update a communication configuration for a device associated with the object based on the reflection of the probing pulse signal.

Another apparatus for wireless communications is described. The apparatus may include means for transmitting, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmitting the probing pulse signal to the object during the transmission window based on the configuration, receiving the reflection of the probing pulse signal from the object during the reception window based on transmitting the probing pulse signal, and updating a communication configuration for a device associated with the object based on the reflection of the probing pulse signal.

A non-transitory computer-readable medium storing code for wireless communications is described. The code may include instructions executable by a processor to transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmit the probing pulse signal to the object during the transmission window based on the configuration, receive the reflection of the probing pulse signal from the object during the reception window based on transmitting the probing pulse signal, and update a communication configuration for a device associated with the object based on the reflection of the probing pulse signal.

In some examples of the method, apparatuses, and non-transitory computer-readable medium described herein, the suspended wireless communications may be between at least one device in the set of devices and at least one device not in the set of devices.

In some examples of the method, apparatuses, and non-transitory computer-readable medium described herein, the device associated with the object moves with the object or remains within proximity of the object.

Some examples of the method, apparatuses, and non-transitory computer-readable medium described herein may further include operations, features, means, or instructions for transmitting the configuration for probing the location of the object to the object.

Some examples of the method, apparatuses, and non-transitory computer-readable medium described herein may further include operations, features, means, or instructions for transmitting the configuration for probing the location of the object to the device associated with the object.

Some examples of the method, apparatuses, and non-transitory computer-readable medium described herein may further include operations, features, means, or instructions for estimating the location of the object based on an arrival latency or a reception angle of the reflection of the probing pulse signal, or a combination thereof.

In some examples of the method, apparatuses, and non-transitory computer-readable medium described herein, updating the communication configuration further may include operations, features, means, or instructions for selecting at least one device in the set of devices to communicate with the device associated with the object, and selecting transmit and receive beams for the communication between the at least one device and the device associated with the object.

In some examples of the method, apparatuses, and non-transitory computer-readable medium described herein, the configuration for probing the location includes a probing pulse transmission pattern.

In some examples of the method, apparatuses, and non-transitory computer-readable medium described herein, the configuration for probing the location of the object includes a set of identifiers for transmitting devices of the set of devices, where the transmitting devices may be configured to transmit additional probing pulse signals during the timing gap in respective transmission windows.

In some examples of the method, apparatuses, and non-transitory computer-readable medium described herein, the configuration for probing the location of the object includes transmit beam identifiers for each of the transmitting devices.

In some examples of the method, apparatuses, and non-transitory computer-readable medium described herein, the configuration for probing the location of the object includes a set of identifiers for receiving devices of the set of devices, where the receiving devices may be configured to receive the reflection of the probing pulse signal during the timing gap in respective reception windows.

In some examples of the method, apparatuses, and non-transitory computer-readable medium described herein, the configuration for probing the location of the object includes receive beam identifiers for each of the receiving devices.

Some examples of the method, apparatuses, and non-transitory computer-readable medium described herein may further include operations, features, means, or instructions for indicating, via the configuration for probing the location, a time gap configuration for the timing gap, where the time gap configuration includes a starting time, a time gap duration, a transmission window duration, a reception window duration, identifiers for devices associated with probing the location of the object, or a combination thereof.

Some examples of the method, apparatuses, and non-transitory computer-readable medium described herein may further include operations, features, means, or instructions for indicating, via the configuration for probing the location, a probing pulse signal duration, a set of tones used for the probing pulse signal, a set of symbols or sub-symbols used for the probing pulse signal, a probing pulse signal sequence, or a combination thereof.

Some examples of the method, apparatuses, and non-transitory computer-readable medium described herein may further include operations, features, means, or instructions for indicating, via the configuration for probing the location, a pulse time, a frequency resource location for the probing pulse signal, a spatial resource location for the probing pulse signal, or any combination thereof.

Some examples of the method, apparatuses, and non-transitory computer-readable medium described herein may further include operations, features, means, or instructions for indicating, via the configuration for probing the location, a receive time window corresponding to times when the reflection of the probing pulse signal may be received at the set of devices.

Some examples of the method, apparatuses, and non-transitory computer-readable medium described herein may further include operations, features, means, or instructions for receiving, from the set of devices, location probing information for the location of the object based on the set of devices receiving the reflection of the probing pulse signal, where the communication configuration may be updated based on the location probing information.

In some examples of the method, apparatuses, and non-transitory computer-readable medium described herein, the configuration for probing the location of the object may be transmitted in a downlink control information message triggering transmission of the probing pulse signal.

In some examples of the method, apparatuses, and non-transitory computer-readable medium described herein, the timing gap for the probing pulse signal may be aperiodic.

Some examples of the method, apparatuses, and non-transitory computer-readable medium described herein may further include operations, features, means, or instructions for transmitting an activating signal enabling transmission of the probing pulse signal.

In some examples of the method, apparatuses, and non-transitory computer-readable medium described herein, the activating signal may be a media access control element or a group common downlink control information transmission.

In some examples of the method, apparatuses, and non-transitory computer-readable medium described herein, the timing gap for the probing pulse signal may be semi-persistent.

In some examples of the method, apparatuses, and non-transitory computer-readable medium described herein, the configuration for probing the location of the object may be transmitted via a Radio Resource Control message.

In some examples of the method, apparatuses, and non-transitory computer-readable medium described herein, the timing gap for the probing pulse signal may be periodic.

In some examples of the method, apparatuses, and non-transitory computer-readable medium described herein, the set of devices includes one or more UEs or one or more cells, or a combination thereof.

In some examples of the method, apparatuses, and non-transitory computer-readable medium described herein, the one or more UEs may be configured for device-to-device communications.

Some examples of the method, apparatuses, and non-transitory computer-readable medium described herein may further include operations, features, means, or instructions for identifying a pulse occasion hopping pattern for transmitting the probing pulse signal, where the probing pulse signal may be transmitted according to the pulse occasion hopping pattern.

In some examples of the method, apparatuses, and non-transitory computer-readable medium described herein, the configuration for probing the location of the object includes the pulse occasion hopping pattern.

In some examples of the method, apparatuses, and non-transitory computer-readable medium described herein, the object may be a UE or a mobile device.

A method of wireless communications at a receiving device is described. The method may include receiving, from a transmitting device, a configuration for probing a location of an object, where the configuration includes a timing gap for transmission of a probing pulse signal, where the timing gap includes at least one transmission window and a reception window, suspending wireless communications during the timing gap based on receiving the configuration for probing the location of the object, receiving a reflection of the probing pulse signal from the object during the reception window based on the transmitting device transmitting the probing pulse signal, and reporting, to the transmitting device, object location information based on the reflection of the probing pulse signal.

An apparatus for wireless communications at a receiving device is described. The apparatus may include a processor, memory coupled with the processor, and instructions stored in the memory. The instructions may be executable by the processor to cause the apparatus to receive, from a transmitting device, a configuration for probing a location of an object, where the configuration includes a timing gap for transmission of a probing pulse signal, where the timing gap includes at least one transmission window and a reception window, suspend wireless communications during the timing gap based on receiving the configuration for probing the location of the object, receive a reflection of the probing pulse signal from the object during the reception window based on the transmitting device transmitting the probing pulse signal, and report, to the transmitting device, object location information based on the reflection of the probing pulse signal.

Another apparatus for wireless communications at a receiving device is described. The apparatus may include means for receiving, from a transmitting device, a configuration for probing a location of an object, where the configuration includes a timing gap for transmission of a probing pulse signal, where the timing gap includes at least one transmission window and a reception window, suspending wireless communications during the timing gap based on receiving the configuration for probing the location of the object, receiving a reflection of the probing pulse signal from the object during the reception window based on the transmitting device transmitting the probing pulse signal, and reporting, to the transmitting device, object location information based on the reflection of the probing pulse signal.

A non-transitory computer-readable medium storing code for wireless communications at a receiving device is described. The code may include instructions executable by a processor to receive, from a transmitting device, a configuration for probing a location of an object, where the configuration includes a timing gap for transmission of a probing pulse signal, where the timing gap includes at least one transmission window and a reception window, suspend wireless communications during the timing gap based on receiving the configuration for probing the location of the object, receive a reflection of the probing pulse signal from the object during the reception window based on the transmitting device transmitting the probing pulse signal, and report, to the transmitting device, object location information based on the reflection of the probing pulse signal.

Some examples of the method, apparatuses, and non-transitory computer-readable medium described herein may further include operations, features, means, or instructions for determining the object location information based on an arrival latency or a reception angle of the reflection of the probing pulse signal, or a combination thereof.

Some examples of the method, apparatuses, and non-transitory computer-readable medium described herein may further include operations, features, means, or instructions for receiving, from the transmitting device, a communication configuration update for the object based at least in reporting the object location information.

In some examples of the method, apparatuses, and non-transitory computer-readable medium described herein, the configuration for probing the location includes a probing pulse transmission pattern.

In some examples of the method, apparatuses, and non-transitory computer-readable medium described herein, the configuration for probing the location of the object includes an identifier for the receiving device, where the receiving device may be configured to receive the probing pulse signal during the reception window based on receiving the configuration.

In some examples of the method, apparatuses, and non-transitory computer-readable medium described herein, the configuration for probing the location of the object includes a receive beam identifier for the receiving device, and where the reflection of the probing pulse signal may be received using a beam corresponding to the receive beam identifier.

Some examples of the method, apparatuses, and non-transitory computer-readable medium described herein may further include operations, features, means, or instructions for identifying, based on the configuration for probing the location, a time gap configuration for the timing gap, where the time gap configuration includes a starting time, a time gap duration, a transmission window duration, a reception window duration, identifiers for devices associated with probing the location of the object, or a combination thereof.

Some examples of the method, apparatuses, and non-transitory computer-readable medium described herein may further include operations, features, means, or instructions for identifying, based on the configuration for probing the location, a probing pulse signal duration, a set of tones used for the probing pulse signal, a set of symbols or sub-symbols used for the probing pulse signal, a probing pulse signal sequence, or a combination thereof.

Some examples of the method, apparatuses, and non-transitory computer-readable medium described herein may further include operations, features, means, or instructions for identifying, based on the configuration for probing the location, a pulse time, a frequency resource location for the probing pulse signal, a spatial resource location for the probing pulse signal, or any combination thereof.

Some examples of the method, apparatuses, and non-transitory computer-readable medium described herein may further include operations, features, means, or instructions for identifying, based on the configuration for probing the location, a receive time window, where the reflection of the probing pulse signal may be received during the receive time window.

In some examples of the method, apparatuses, and non-transitory computer-readable medium described herein, the configuration for probing the location of the object may be received in a downlink control information message triggering the transmission of the probing pulse signal.

In some examples of the method, apparatuses, and non-transitory computer-readable medium described herein, the timing gap for the probing pulse signal may be aperiodic.

Some examples of the method, apparatuses, and non-transitory computer-readable medium described herein may further include operations, features, means, or instructions for receiving an activating signal enabling transmission of the probing pulse signal.

In some examples of the method, apparatuses, and non-transitory computer-readable medium described herein, the activating signal may be a Media Access Control element or a group common downlink control information transmission.

In some examples of the method, apparatuses, and non-transitory computer-readable medium described herein, the timing gap for the probing pulse signal may be semi-persistent.

In some examples of the method, apparatuses, and non-transitory computer-readable medium described herein, the configuration for probing the location of the object may be received via a Radio Resource Control message.

In some examples of the method, apparatuses, and non-transitory computer-readable medium described herein, the timing gap for the probing pulse signal may be periodic.

In some examples of the method, apparatuses, and non-transitory computer-readable medium described herein, the receiving device may be a UE or a cell.

In some examples of the method, apparatuses, and non-transitory computer-readable medium described herein, the receiving device may be configured for device-to-device communications.

Some examples of the method, apparatuses, and non-transitory computer-readable medium described herein may further include operations, features, means, or instructions for identifying a pulse occasion hopping pattern for transmitting the probing pulse signal, where the configuration for probing the location of the object includes the pulse occasion hopping pattern, and monitoring for the reflection of the probing pulse signal according to the pulse occasion hopping pattern.

In some examples of the method, apparatuses, and non-transitory computer-readable medium described herein, the object may be a UE or a mobile device.

DETAILED DESCRIPTION

Figure 1:
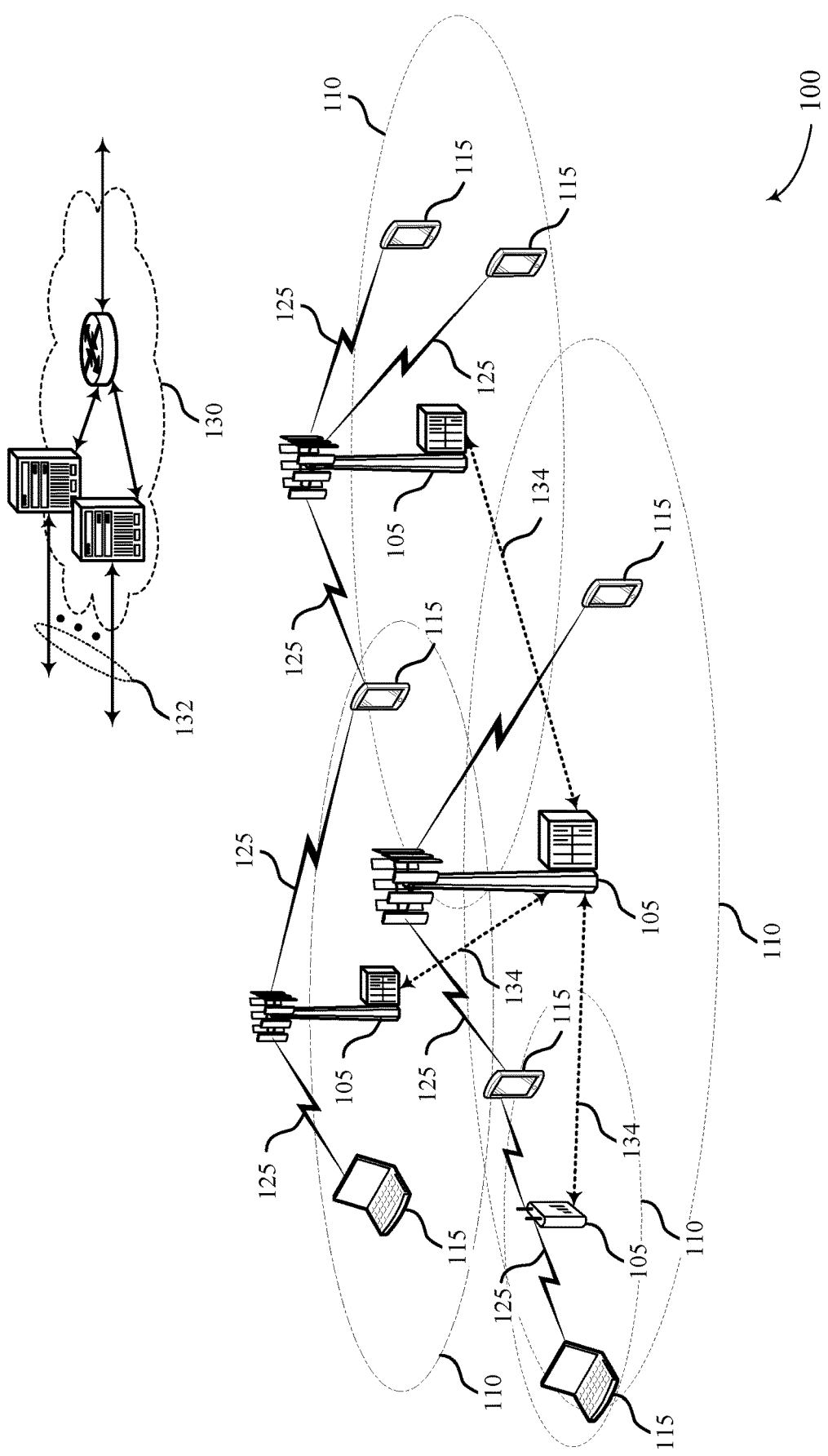
FIG. 1 illustrates an example of a wireless communications system that supports techniques for configuring a time gap for a probing pulse signal in accordance with aspects of the present disclosure.

A base station providing a serving cell for a user equipment (UE) may track the location of the UE. As the UE moves within a wireless communications system, the base station may implement techniques to locate the UE. If the base station knows the location of the UE, the base station may be able to quickly select a cell and beam for the UE. If, for example, the UE is in an idle mode, knowing the positioning information of the UE may improve paging techniques. If the UE is in a connected mode, the base station may select a cell and beam before the UE wakes up, for example without performing beam sweep-based training. In some examples, the base station may transmit a probing pulse signal to the UE. The probing pulse signal may reflect off the UE, and the base station may receive a reflection of the probing pulse signal. The base station may estimate a location of the UE based on an arrival latency of the reflection. While location estimation techniques using one cell and one UE may provide an estimate of a direction of the UE, these techniques do not provide granular location information. For example, these techniques may not provide sufficient information related to a distance between the cell and the UE.

Described herein are enhanced techniques for identifying a location of an object such as a UE. For example, a transmitting device may transmit a probing pulse signal, which is reflected off the UE. Other devices, such as base stations or UEs, may measure the reflections of the probing pulse signal. The other devices may estimate a location of the UE based on an arrival latency or an arrival angle of the reflections. The devices may convey the estimated location information for the UE to the transmitting device, and the transmitting device may determine a more precise location estimate for the UE using the location information from the other devices. To support these techniques, the transmitting and receiving devices may be configured to suspend communications. For example, the devices may cease wireless communications for a timing gap, during which the transmitting device transmits the probing pulse signal, and the receiving devices receive respective reflected signals (e.g., without interference from the suspended communications).

The transmitting device may configure the timing gap. For example, the transmitting device may transmit the configuration to a set of devices configured to receive the reflection, devices configured to also transmit a probing pulse signal, and the device or object reflecting the probing pulse signal. The configuration of the timing gap may specify a probing pulse transmission pattern. For example, the configuration may include a timing gap configuration, a pulse signal configuration, a configuration for each pulse transmit occasion in the timing gap, and a pulse occasion hopping pattern in the timing gap. The timing gaps may be configured to be periodic, semi-persistent, or aperiodic. The techniques described herein may be implemented by a UE or a base station. In some cases, the techniques may be applied in a device-to-device (D2D) system. For example, the transmitting device and each of the receiving devices may be UEs. In another example, the transmitting device may be a base station, and the receiving devices may be UEs, base stations, or a combination thereof.

Aspects of the disclosure are initially described in the context of a wireless communications system. Aspects of the disclosure are further illustrated by and described with reference to apparatus diagrams, system diagrams, and flowcharts that relate to techniques for configuring a time gap for a probing pulse signal.

FIG. 1 illustrates an example of a wireless communications system 100 that supports techniques for configuring a time gap for a probing pulse signal in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f = 307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 providing a serving cell for a UE 115 may track the location of the UE 115. As the UE 115 moves within a wireless communications system, the base station 105 may implement techniques to locate the UE 115. The base station 105 may transmit a probing pulse signal to the UE 115, which may reflect off the UE 115 and be measured by the base station 105 and one or more other devices. The devices may estimate the location of the UE 115 based on arrival latency of the reflection or an arrival angle of the reflection and provide these estimates to the base station 105. The base station 105 may then make a location estimate of the UE 115 based on the multiple location estimates.

To support these techniques, the transmitting and receiving devices may be configured to suspend communications. For example, the devices may cease wireless communications for a timing gap, during which the base station 105 may transmit the probing pulse signal, and the receiving devices may monitor for and receive respective reflected signals. The base station 105 may configure the timing gap. For example, the base station 105 may transmit the configuration to a set of devices configured to receive the reflection, to other devices configured to also transmit a probing pulse signal, and to the device or object reflecting the probing pulse signal. The configuration of the timing gap may specify a probing pulse transmission pattern. For example, the configuration may include a timing gap configuration, a pulse signal configuration, a configuration for each pulse transmit occasion in the timing gap, and a pulse occasion hopping pattern in the timing gap. The timing gaps may be configured to be periodic, semi-persistent, or aperiodic. The techniques described herein may be implemented by a UE 115 or a base station 105. For example, the techniques may be applied in a D2D system. For example, a UE 115 may transmit the probing pulse signal, which may be reflected and measured by other UEs 115.

Figure 2:
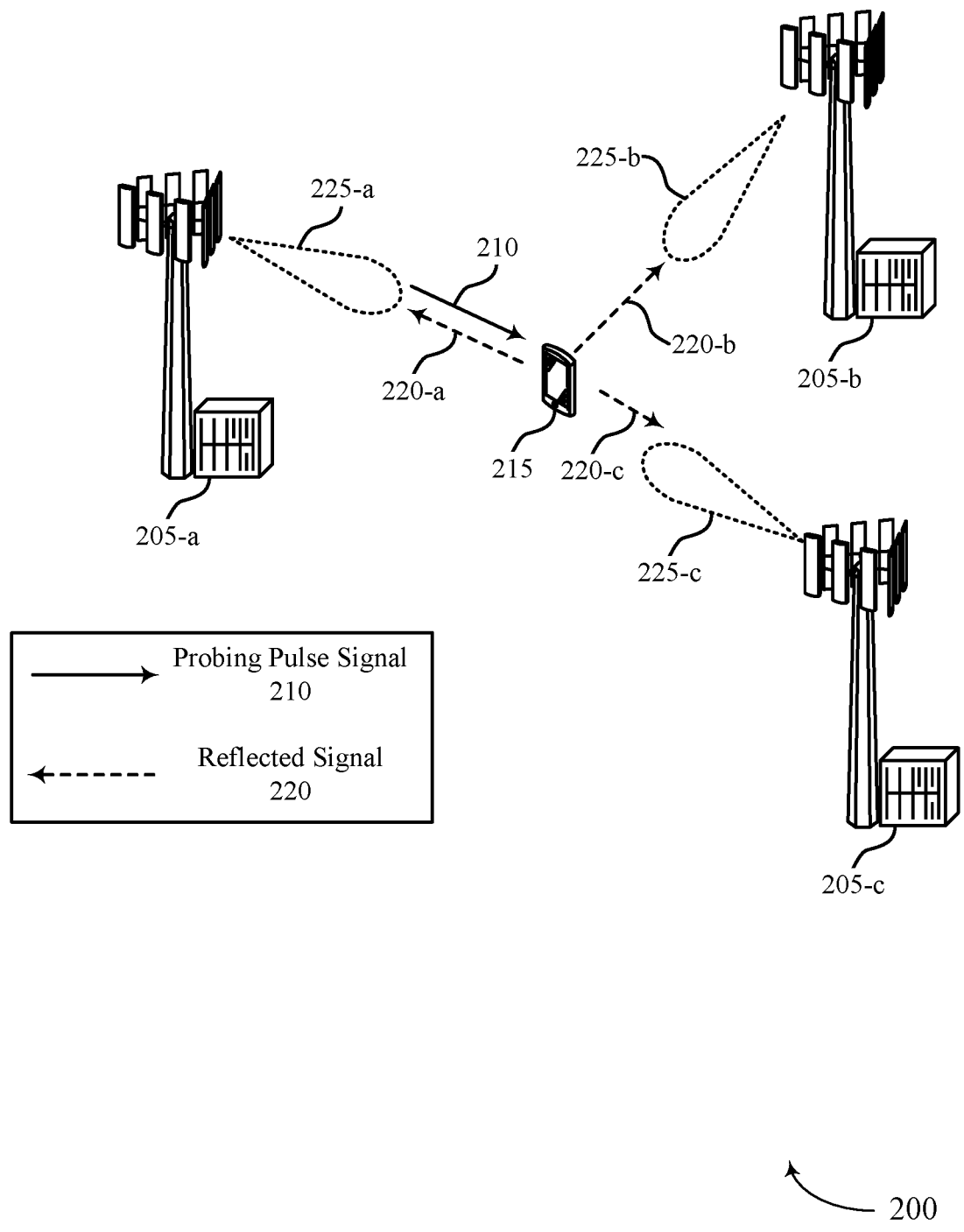
FIG. 2 illustrates an example of a wireless communications system that supports techniques for configuring a time gap for a probing pulse signal in accordance with aspects of the present disclosure.

FIG. 2 illustrates an example of a wireless communications system 200 that supports techniques for configuring a time gap for a probing pulse signal in accordance with aspects of the present disclosure. In some examples, the wireless communications system 200 may implement aspects of wireless communications system 100.

The wireless communications system may include UE 215 and a set of base stations 205, including base station 205-a, base station 205-b, and base station 205-c. The base stations 205 may each be an example of a base station 105 as described with reference to FIG. 1. UE 215 may be an example of an object or a mobile device. For example, UE 215 may be an example of a UE 115 as described with reference to FIG. 1. In some examples, UE 215 may be a vehicle, a sensor, machinery in a manufacturing environment, etc.

UE 215 and the base stations 205 may support beamformed communications. For example, base station 205-a may directionally transmit toward UE 215 using a beam 225 (e.g., beam 225-a). UE 215 may monitor for transmissions from base station 205-a using a directional receive beam. Base stations 205 may transmit to UE 215 using different beams based on the location of UE 215. For example, transmissions from base station 205-a and base station 205-b may be spatially multiplexed together, as the base stations 205 may use different transmit beams pointing in different directions toward UE 215.

A serving cell for UE 215 may track the location of UE 215. For example, base station 205-a may be the serving cell for UE 215. As UE 215 moves within the wireless communications system, base station 205-a may implement techniques to locate UE 215. It may be beneficial to quickly identify the location of UE 215, regardless of a state of UE 215. If UE 215 is in an idle mode, knowing the location of UE 215 may assist base station 205-a in quickly selecting the right cell and right beam for paging UE 215. For example, if base station 205-a knows the location of UE 215, base station 205-a may quickly improve the rate of paging UE 215. For example, base station 205-a may not use multiple cells and all possible beam configurations to page UE 215. If UE 215 is in a connected mode (e.g., connected discontinuous reception mode (C-DRX)), base station 205-a may quickly select a cell and beam before UE 215 wakes up instead of performing beam sweep-based training.

In some examples, base station 205-*a* may transmit a probing pulse signal 210 to UE 215. The probing pulse signal 210 may reflect off UE 215, and base station 205-*a* may receive a reflection 220 of the probing pulse signal 210. Base station 205-*a* may estimate a location of UE 215 based on an arrival latency of the reflection 220 (e.g., reflection 220-*a*). While location estimation techniques using one cell and one UE 115 may provide an estimate of a direction of the UE 115, these techniques may not provide granular location information. For example, these techniques may not provide sufficient information related to a distance between the cell and the UE 115.

The wireless communications system 200 supports enhanced techniques for identifying the location of an object, such as UE 215. For example, the probing pulse signal 210 may be reflected off UE 215, and other devices, such as base station 205-*b* and base station 205-*c*, may measure the reflections 220 of the probing pulse signal 210. Base station 205-*b* and base station 205-*c* may estimate a location of UE 215 based on reflection 220-*b* and reflection 220-*c*, respectively. For example, the base stations 205 may estimate the location of UE 215 based on the arrival latency or angle of the reflections 220 of the probing pulse signal 210. Base station 205-*b* and base station 205-*c* may convey the estimated location information for UE 215 to base station 205-*a*, and base station 205-*a* may determine a more precise location estimate for UE 215 using the location information from the other devices.

To support these techniques, traffic may be suspended for the devices (e.g., devices transmitting the probing pulse signal 210 or devices receiving a reflection 220) for a timing gap. For example, base station 205-*b* and base station 205-*c* may cease wireless communications for the timing gap, during which base station 205-*a* transmits the probing pulse signal, and base station 205-*b* and base station 205-*c* receive respective reflections 220. In an example, base station 205-*c* may suspend wireless communications with another UE 115 (e.g., another UE 115 served by base station 205-*c*). UE 215 may also be configured to cease wireless communications during the probing signal. The probing pulse signal 210 may not be interfered with if wireless communications are suspended, and the devices configured to receive the reflection 220 of the probing pulse signal 210 may be available to monitor for the reflection 220.

Base station 205-*a* may configure the timing gap. For example, base station 205-*a* may transmit a configuration for the timing gap to a set of devices configured to receive the reflection 220 of the probing pulse signal 210. In some cases, base station 205-*a* may transmit the configuration for the timing gap to configure other devices to also transmit a probing pulse signal 210. In an example, base station 205-*a* may configure base station 205-*c* to also transmit a probing pulse signal.

The configuration of the timing gap may specify a probing pulse transmission pattern. For example, the configuration may include a timing gap configuration, including a starting time, a window duration, and device identifiers involved in the probing pulse signal transmission or reception. The timing gap configuration may include a configuration for each pulse transmission occasion in the timing gap. For example, the configuration may indicate time, frequency, and spatial resource locations for the probing pulse signal 210, or any combination thereof. In some cases, the configuration may include a transmit window (e.g., corresponding to when base station 205-*a* is to transmit the probing pulse signal) and one or more receive windows. The receive time windows may correspond to when the reflection 220 may arrive at the receiving devices. For example, the reflection 220 may arrive at receiving devices later due to propagation delay in the transmission path, reception paths, or both.

In some examples, the configuration may specify transmitters and receivers involved in transmitting or receiving the probing pulse signal 210 or reflection 220. For example, the configuration may indicate pulse sending device identifiers. In some cases, the configuration may indicate transmit beam identifiers per sending device. For example, the configuration may indicate base station 205-*a* as a transmitter of the probing pulse signal 210. The configuration may indicate pulse receiving device identifiers. In some cases, the configuration may indicate UE 215 as the reflecting device. The configuration may indicate base station 205-*b* and base station 205-*c* as devices configured to receive the reflection 220. In some cases, the configuration may specify receive beam identifiers per receiving device. In some cases, the configuration may specify that base station 205-*a* transmits the probing pulse signal to UE 215, and base station 205-*b* and base station 205-*c* are to monitor for the reflection 220 of the probing pulse signal 210.

The configuration may include a pulse signal configuration. For example, the configuration may include a pulse signal duration, the tones, symbols, or sub-symbols used to transmit the probing pulse signal 210, and a transmitted sequence. The pulse signal configuration may assist a receiving device (e.g., base station 205-*b* or base station 205-*c*) to detect the reflection 220 of the probing pulse signal 210. In some cases, the configuration may include a pulse occasion hopping pattern in the timing gap. For example, the configuration may specify pulse resource locations. Corresponding pulse signal transmitters may hop based on the pre-determined pattern. Similarly, receiving devices may monitor for the reflection 220 based on the pattern indicated by the configuration.

The timing gap may be periodic, semi-persistent, or aperiodic. In some cases, this may correspond to, respectively, a periodic location probing, a semi-persistent location probing, and an aperiodic location probing of UE 215. For a periodic timing gap, base station 205-*a* may configure the timing gap via RRC. For example, base station 205-*a* may configure the periodic probing as part of the RRC configuration. The RRC configuration may include the probing pulse pattern as described, and the devices may, if configured, periodically transmit the probing pulse signal 210 and monitor for the reflection 220 of the probing pulse signal 210.

In some cases, the timing gap may be semi-persistent. A semi-persistent timing gap may be activated by a MAC CE, a group common downlink control information (DCI), or both. For example, base station 205-*a* may transmit a slot format indicator (SFI) or a preemption indicator to toggle (e.g., activate or deactivate) the timing gap. In some cases, the semi-persistent timing gap may be configured via RRC and activated or deactivated based on the MAC CE or group common DCI. In some examples, base station 205-*a* may transmit the full configuration for the timing gap in the toggling signal (e.g., the MAC CE or group common DCI). In some other examples, the timing gap configuration may be configured at another layer than the RRC.

In another example, the timing gap may be aperiodic. For example, base station 205-*a* may trigger an aperiodic timing gap via DCI (e.g., on demand). Base station 205-*a* may transmit the DCI to UE 215 indicating the timing configuration. In some cases, base station 205-*a* may indicate the configuration to the other base stations 205 (e.g., base station 205-*b*, base station 205-*c*) via backhaul links (e.g., wireless or physical backhaul links) or over a wireless channel.

Base station 205-*b* and base station 205-*c* may estimate a location of UE 215 based on the reflections 220. Base station 205-*b* and base station 205-*c* may estimate the location of UE 215 based on, for example, an arrival latency or an arrival angle of the reflections 220. The base stations 205 may report the estimated location information to base station 205-*a*. In some cases, base station 205-*a* may update a cell or beam configuration for UE 215 based on the reported and determined location information. For example, base station 205-*a* may configure one of the other base stations 205 (e.g., base station 205-*b*, base station 205-*c*) as a serving cell of UE 215, configuring base station 205-*b* to use beam 225-*b* or configuring base station 205-*c* to use beam 225-*c*.

The techniques described herein may be implemented by a UE 115 or a base station 205. In some cases, the techniques may be applied in a device-to-device (D2D) system. For example, a first UE 115 may configure a set of UEs 115 for probing the location of an object. For example, the first UE 115 may perform techniques similar to base station 205-*a*, and the set of UEs 115 may perform techniques similar to base station 205-*b* and base station 205-*c*. The first UE 115 may transmit a configuration for probing the location of the object to the set of UEs 115. The configuration may include a configuration for a timing gap, which may specify a probing pulse transmission pattern. In this example, the first UE 115 may transmit the probing pulse signal, and the first UE 115 and the set of UEs 115 may receive the reflection of the probing pulse signal. In this example, the object (e.g., whose location is being probed) may also be a UE 115, another wireless device, or a non-wireless device which is associated with another wireless device. For example, the object may be a car, robot, or manufacturing component, and a device (e.g., a UE 115) may travel in close proximity to the object.

Figure 3:
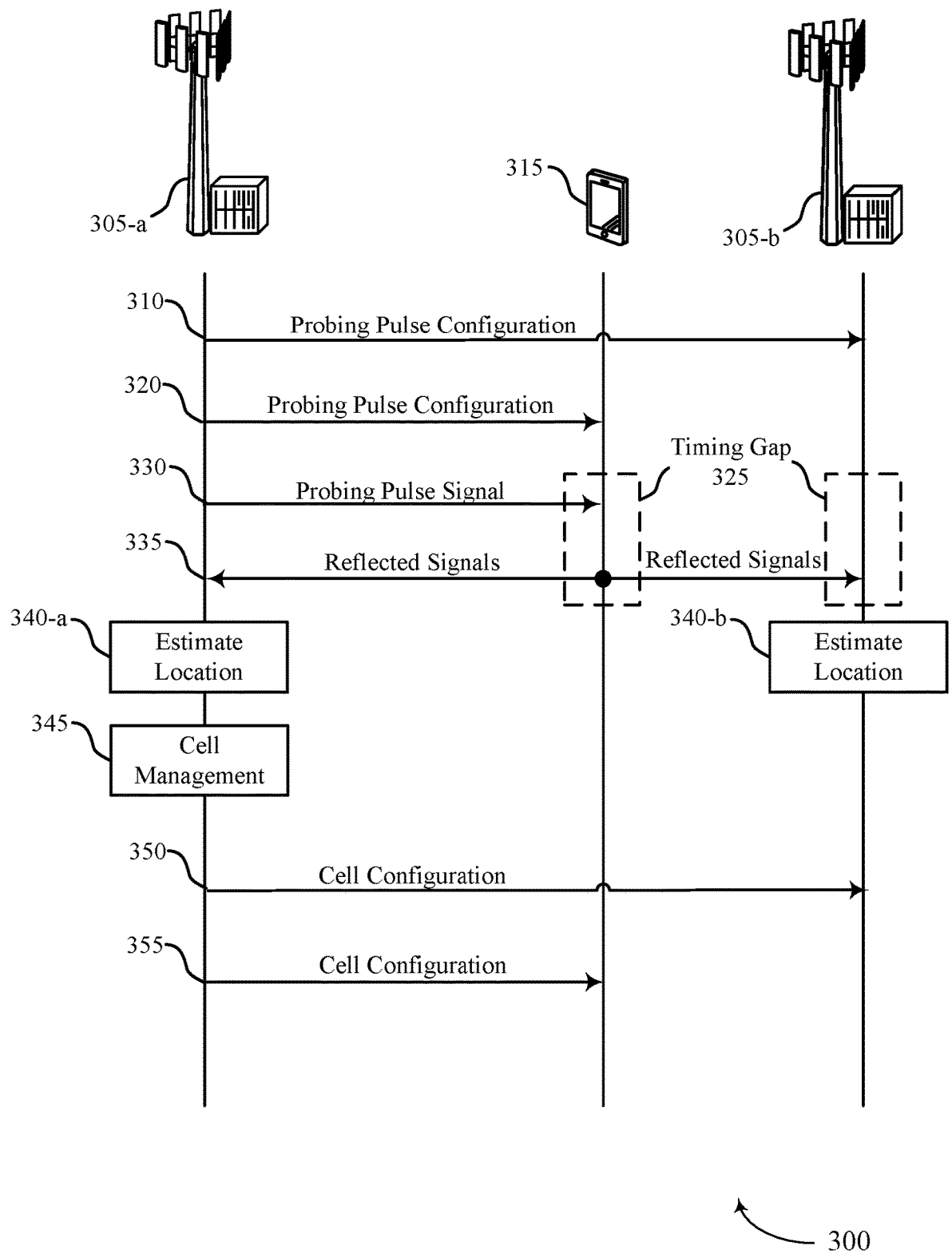
FIG. 3 illustrates an example of a process flow that supports techniques for configuring a time gap for a probing pulse signal in accordance with aspects of the present disclosure.

FIG. 3 illustrates an example of a process flow 300 that supports techniques for configuring a time gap for a probing pulse signal in accordance with aspects of the present disclosure. In some examples, the process flow 300 may implement aspects of wireless communications system 100. The process flow 300 includes base station 305-*a* and base station 305-*b*, which may each be an example of a base station 105 (as shown in FIG. 1) as described herein. The process flow may include UE 315, which may be an example of a UE 115 (as shown in FIG. 1) as described herein. In some other examples, the techniques of process flow 300 may be performed by UEs 115, for example in a D2D wireless communications scheme.

Base station 305-*a* may be an example of a serving cell. Base station 305-*a* may determine a configuration for probing a location of an object. For example, the object may be UE 315, and base station 305-*a* may maintain position information for UE 315, such as for mobility management, paging techniques, etc. In some other examples, the object may travel in close proximity to UE 315. For example, UE 315 may be an example of a device which moves in proximity to machinery, a car, etc., which may be an example of the object.

At 310, base station 305-*a* may transmit, to a set of devices, the configuration for probing the location of an object, where the configuration includes a timing gap 325 associated with at least one transmission window and a reception window for a probing pulse signal. In some cases, the configuration may indicate for the set of devices to suspend wireless communications during the timing gap 325 to receive a reflection of the probing pulse signal. The set of devices may include at least base station 305-*b* and may include other base stations 105 or UEs 115. In some cases, at 320, base station 305-*a* may transmit the probing pulse configuration to UE 315.

The probing pulse configuration may indicate a probing pulse transmission pattern. For example, the configuration may include a time gap configuration, a pulse signal configuration, a configuration for each pulse transmit occasion in the timing gap 325, a pulse occasion hopping pattern in the time gap, or any combination thereof. In some cases, the configuration may specify a starting time, window duration, and identifiers for devices involved in transmitting the probing pulse signal or receiving a reflection of the probing pulse signal.

Devices in the set of devices may receive the configuration and suspend wireless communications during the timing gap accordingly. For example, base station 305-*b* may receive the configuration for probing the location of the object, and base station 305-*b* may suspend wireless communications during the timing gap 325 based on receiving the configuration for probing the location of the object. For example, base station 305-*b* may refrain from scheduling another UE 115 during the timing gap 325.

At 330, base station 305-*a* may transmit the probing pulse signal to the object during the transmission window based on the configuration. In examples where UE 315 is the object, base station 305-*a* may transmit the probing pulse signal to UE 315. The probing pulse signal may reflect off of UE 315 (e.g., similar to RADAR). At 335, base station 305-*a* may receive the reflection of the probing pulse signal from the object during the reception window. Base station 305-*b* may also receive a reflection of the probing pulse signal from the object during a reception window. In some cases, a reception window for base station 305-*b* may be different than a reception window for base station 305-*b*, for example based on propagation delay or path loss.

At 340-*a* and 340-*b*, base station 305-*a* and base station 305-*b* may, respectively, estimate the location of the object (e.g., UE 315) based on an arrival latency or a reception angle of the reflection of the probing pulse signal, or a combination thereof. In some cases, base station 305-*b* may report, to base station 305-*a*, object location information based on the reflection of the probing pulse signal. For example, base station 305-*a* may receive an estimate of the location of UE 315 from base station 305-*b* based on base station 305-*b* receiving the reflection of the probing pulse signal.

At 345, base station 305-*a* may update a communication configuration for a device associated with the object based on the reflection of the probing pulse signal. In some cases, UE 315 may be the device, the object, or both. If, for example, UE 315 is in an idle mode, base station 305-*a* may select a best cell and beam for paging UE 315. If UE 315 is in a connected mode (e.g., C-DRX), base station 305-*a* may pick a best cell and beam (e.g., before UE 315 wakes up).

In some cases, if base station 305-*a* modifies the communication configuration for UE 315, base station 305-*a* may transmit a cell configuration update to base station 305-*b* at 350. For example, base station 305-*a* may configure base station 305-*b* to be a serving cell for UE 315. In some examples, the cell configuration update may include a beam identifier. In some cases, at 355 base station 305-*a* may transmit the cell configuration update to UE 315, which may indicate the change of cells or change of beam.

Figure 4:
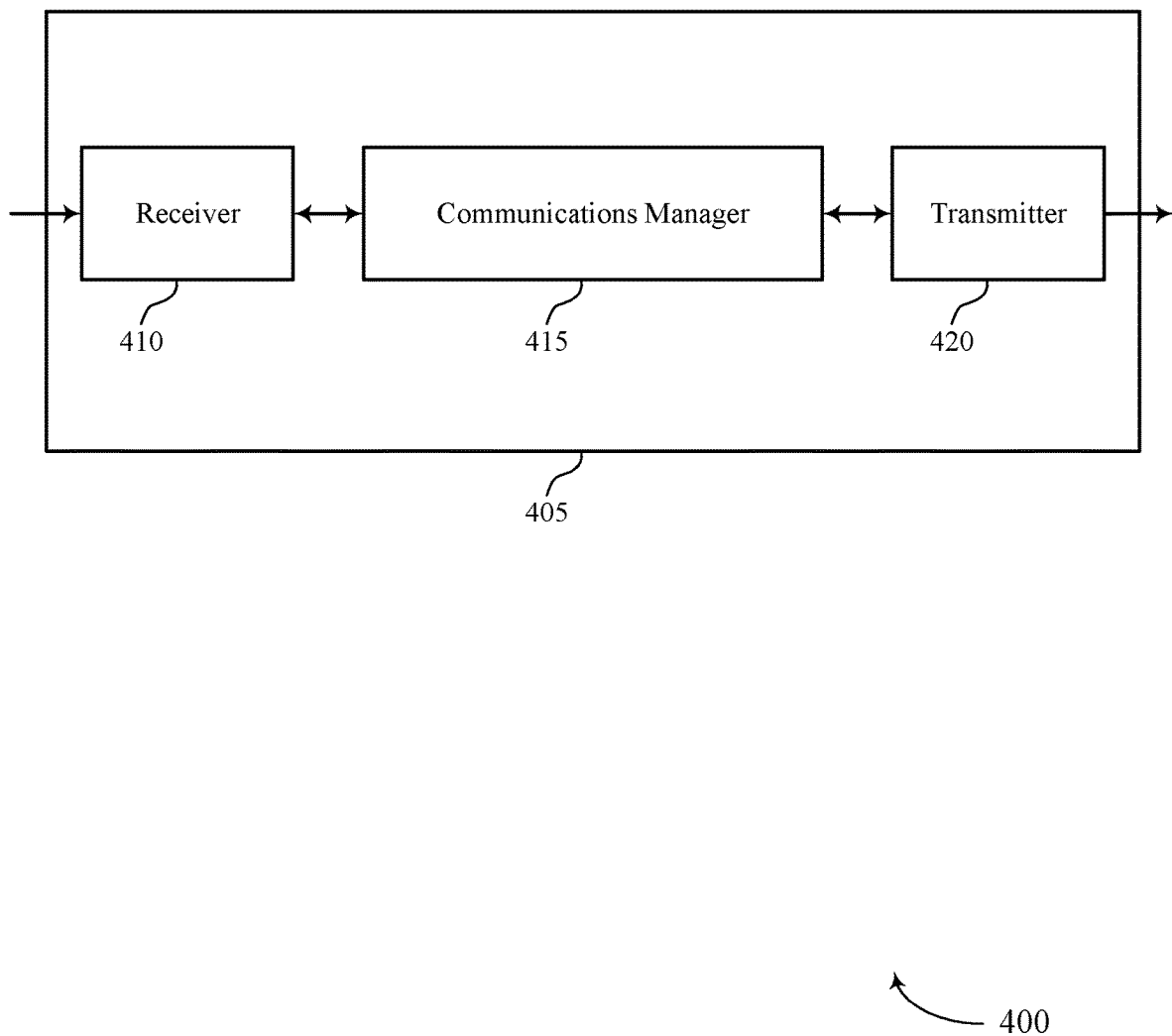
FIGS. 4 and 5 show block diagrams of devices that support techniques for configuring a time gap for a probing pulse signal in accordance with aspects of the present disclosure.

FIG. 4 shows a block diagram 400 of a device 405 that supports techniques for configuring a time gap for a probing pulse signal in accordance with aspects of the present disclosure. The device 405 may be an example of aspects of a UE 115 or base station 105 as described herein. The device 405 may include a receiver 410, a communications manager 415, and a transmitter 420. The device 405 may also include a processor. Each of these components may be in communication with one another (e.g., via one or more buses).

Receiver 410 may receive information such as packets, user data, or control information associated with various information channels (e.g., control channels, data channels, and information related to techniques for configuring a time gap for a probing pulse signal, etc.). Information may be passed on to other components of the device 405. The receiver 410 may be an example of aspects of the transceiver 720 or 820 as described with reference to FIGS. 7 and 8. The receiver 410 may utilize a single antenna or a set of antennas.

The communications manager 415 may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmit the probing pulse signal to the object during the transmission window based on the configuration, receive the reflection of the probing pulse signal from the object during the reception window based on transmitting the probing pulse signal, and update a communication configuration for a device associated with the object based on the reflection of the probing pulse signal. The communications manager 415 may also receive, from a transmitting device, a configuration for probing a location of an object, where the configuration includes a timing gap for transmission of a probing pulse signal, where the timing gap includes at least one transmission window and a reception window, suspend wireless communications during the timing gap based on receiving the configuration for probing the location of the object, receive a reflection of the probing pulse signal from the object during the reception window based on the transmitting device transmitting the probing pulse signal, and report, to the transmitting device, object location information based on the reflection of the probing pulse signal. The communications manager 415 may be an example of aspects of the communications manager 710 or 810 as described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 415 as described herein may be implemented to realize one or more potential advantages for a UE 115 (as shown in FIG. 1). One implementation may enable a UE 115 to quickly be configured with a serving cell and high quality beam. For example, instead of the UE 115 performing beam sweep-based training when waking up in a connected state, a base station 105 serving the UE 115 may implement the techniques described herein to know the location of the UE 115 and quickly select a cell and beam for the UE 115 before the UE 115 wakes up. The UE 115 may then proceed with wireless communications instead of waiting to complete beam sweep-based training. Additionally, this may conserve power at the UE 115, as the UE 115 may be configured with a beam instead of performing procedures to modify antenna configurations and receive beams to identify a strong beam pair.

The actions performed by the communications manager 415 as described herein may be implemented to realize one or more potential advantages for a transmitting device (e.g., a UE 115 or a base station 105). One implementation may enable the transmitting device to quickly identify a serving cell and beam for paging a UE 115 operating in an idle mode. For example, instead of using multiple cells and all possible beams, the transmitting device may know the location of the UE 115 and select a cell and beam to page the UE 115 based on the location information.

Transmitter 420 may transmit signals generated by other components of the device 405. In some examples, the transmitter 420 may be collocated with a receiver 410 in a transceiver component. For example, the transmitter 420 may be an example of aspects of the transceiver 720 or 820 as described with reference to FIGS. 7 and 8. The transmitter 420 may utilize a single antenna or a set of antennas.

Figure 5:
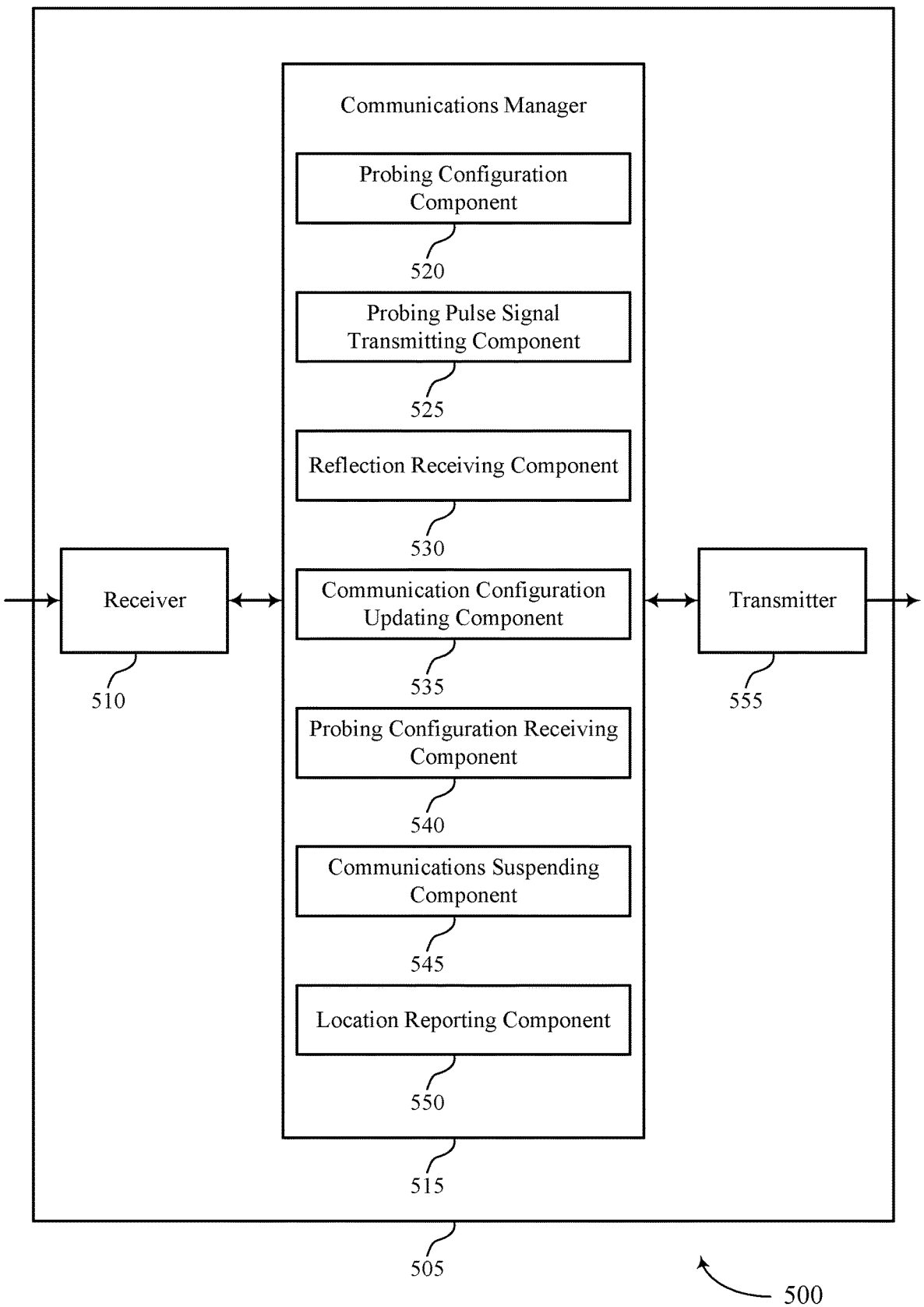

FIG. 5 shows a block diagram 500 of a device 505 that supports techniques for configuring a time gap for a probing pulse signal in accordance with aspects of the present disclosure. The device 505 may be an example of aspects of a device 405, a UE 115, or a base station 105 as described herein. The device 505 may include a receiver 510, a communications manager 515, and a transmitter 555. The device 505 may also include a processor. Each of these components may be in communication with one another (e.g., via one or more buses).

Receiver 510 may receive information such as packets, user data, or control information associated with various information channels (e.g., control channels, data channels, and information related to techniques for configuring a time gap for a probing pulse signal, etc.). Information may be passed on to other components of the device 505. The receiver 510 may be an example of aspects of the transceiver 720 or 820 as described with reference to FIGS. 7 and 8. The receiver 510 may utilize a single antenna or a set of antennas.

The communications manager 515 may be an example of aspects of the communications manager 415 as described herein. The communications manager 515 may include a probing configuration component 520, a probing pulse signal transmitting component 525, a reflection receiving component 530, a communication configuration updating component 535, a probing configuration receiving component 540, a communications suspending component 545, and a location reporting component 550. The communications manager 515 may be an example of aspects of the communications manager 710 or 810 as described herein.

The probing configuration component 520 may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal.

The probing pulse signal transmitting component 525 may transmit the probing pulse signal to the object during the transmission window based on the configuration. The reflection receiving component 530 may receive the reflection of the probing pulse signal from the object during the reception window based on transmitting the probing pulse signal. The communication configuration updating component 535 may update a communication configuration for a device associated with the object based on the reflection of the probing pulse signal. The probing configuration receiving component 540 may receive, from a transmitting device, a configuration for probing a location of an object, where the configuration includes a timing gap for transmission of a probing pulse signal, where the timing gap includes at least one transmission window and a reception window.

The communications suspending component 545 may suspend wireless communications during the timing gap based on receiving the configuration for probing the location of the object. The reflection receiving component 530 may receive a reflection of the probing pulse signal from the object during the reception window based on the transmitting device transmitting the probing pulse signal. The location reporting component 550 may report, to the transmitting device, object location information based on the reflection of the probing pulse signal.

Transmitter 555 may transmit signals generated by other components of the device 505. In some examples, the transmitter 555 may be collocated with a receiver 510 in a transceiver component. For example, the transmitter 555 may be an example of aspects of the transceiver 720 or 820 as described with reference to FIGS. 7 and 8. The transmitter 555 may utilize a single antenna or a set of antennas.

Figure 6:
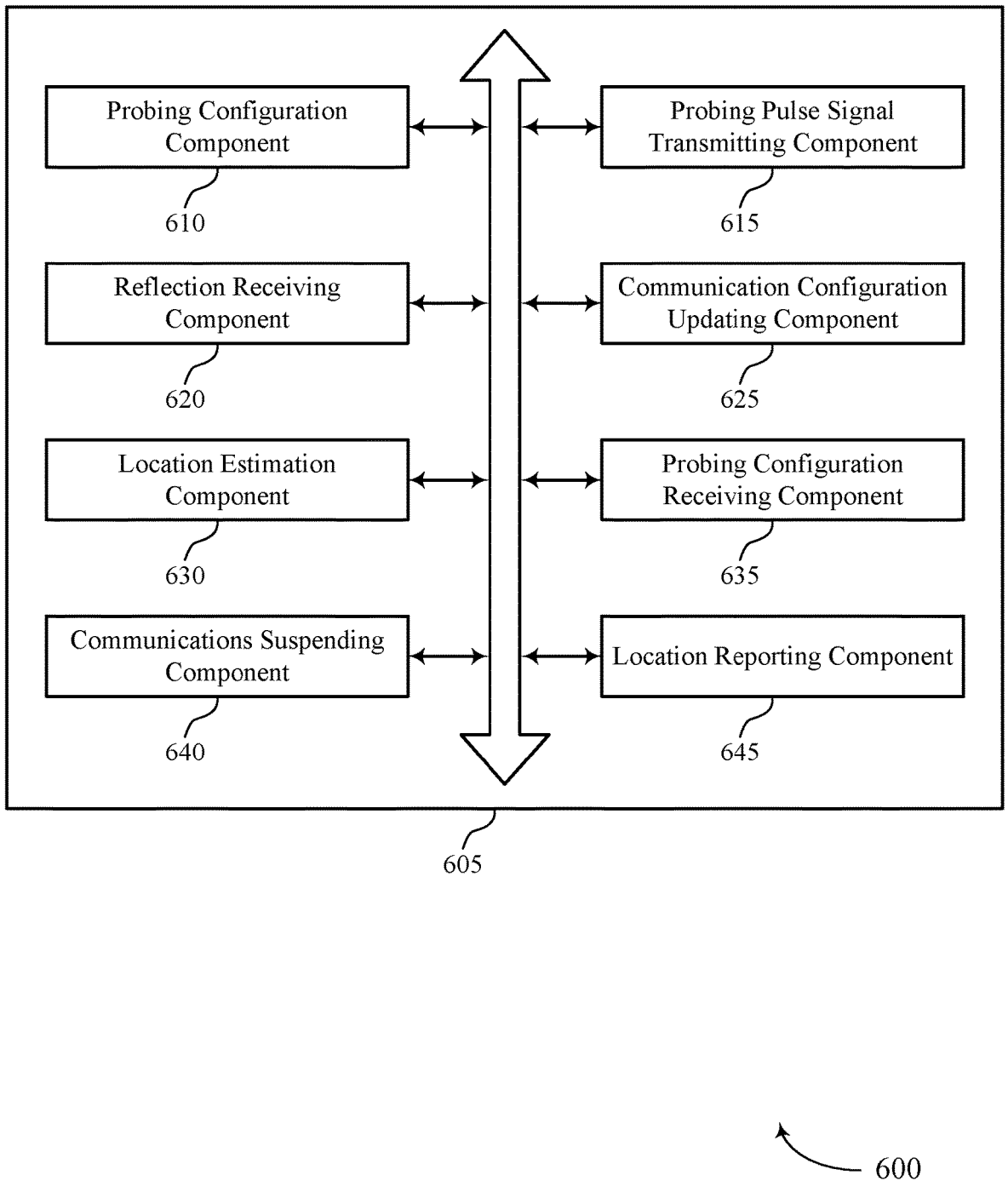
FIG. 6 shows a block diagram of a communications manager that supports techniques for configuring a time gap for a probing pulse signal in accordance with aspects of the present disclosure.

FIG. 6 shows a block diagram 600 of a communications manager 605 that supports techniques for configuring a time gap for a probing pulse signal in accordance with aspects of the present disclosure. The communications manager 605 may be an example of aspects of a communications manager 415, a communications manager 515, or a communications manager 710 described herein. The communications manager 605 may include a probing configuration component 610, a probing pulse signal transmitting component 615, a reflection receiving component 620, a communication configuration updating component 625, a location estimation component 630, a probing configuration receiving component 635, a communications suspending component 640, and a location reporting component 645. Each of these components may communicate, directly or indirectly, with one another (e.g., via one or more buses).

The probing configuration component 610 may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal. In some examples, the probing configuration component 610 may transmit the configuration for probing the location of the object to the object. In some examples, the probing configuration component 610 may transmit the configuration for probing the location of the object to the device associated with the object.

In some examples, the probing configuration component 610 may indicate, via the configuration for probing the location, a time gap configuration for the timing gap, where the time gap configuration includes a starting time, a time gap duration, a transmission window duration, a reception window duration, identifiers for devices associated with probing the location of the object, or a combination thereof.

In some examples, the probing configuration component 610 may indicate, via the configuration for probing the location, a probing pulse signal duration, a set of tones used for the probing pulse signal, a set of symbols or sub-symbols used for the probing pulse signal, a probing pulse signal sequence, or a combination thereof. In some examples, the probing configuration component 610 may indicate, via the configuration for probing the location, a pulse time, a frequency resource location for the probing pulse signal, a spatial resource location for the probing pulse signal, or any combination thereof.

In some examples, the probing configuration component 610 may indicate, via the configuration for probing the location, a receive time window corresponding to times when the reflection of the probing pulse signal is received at the set of devices. In some examples, the probing configuration component 610 may receive, from the set of devices, location probing information for the location of the object based on the set of devices receiving the reflection of the probing pulse signal, where the communication configuration is updated based on the location probing information.

In some examples, the probing configuration component 610 may transmit an activating signal enabling transmission of the probing pulse signal. In some examples, the probing configuration component 610 may identify a pulse occasion hopping pattern for transmitting the probing pulse signal, where the probing pulse signal is transmitted according to the pulse occasion hopping pattern. In some cases, the suspended wireless communications are between at least one device in the set of devices and at least one device not in the set of devices. In some cases, the configuration for probing the location includes a probing pulse transmission pattern.

In some cases, the configuration for probing the location of the object includes a set of identifiers for transmitting devices of the set of devices, where the transmitting devices are configured to transmit additional probing pulse signals during the timing gap in respective transmission windows. In some cases, the configuration for probing the location of the object includes transmit beam identifiers for each of the transmitting devices. In some cases, the configuration for probing the location of the object includes a set of identifiers for receiving devices of the set of devices, where the receiving devices are configured to receive the reflection of the probing pulse signal during the timing gap in respective reception windows.

In some cases, the configuration for probing the location of the object includes receive beam identifiers for each of the receiving devices. In some cases, the configuration for probing the location of the object is transmitted in a downlink control information message triggering transmission of the probing pulse signal. In some cases, the timing gap for the probing pulse signal is aperiodic. In some cases, the activating signal is a media access control element or a group common downlink control information transmission.

In some cases, the timing gap for the probing pulse signal is semi-persistent. In some cases, the configuration for probing the location of the object is transmitted via a Radio Resource Control message. In some cases, the timing gap for the probing pulse signal is periodic.

In some cases, the set of devices includes one or UEs or one or more cells, or a combination thereof. In some cases, the one or more UEs are configured for device-to-device communications. In some cases, the configuration for probing the location of the object includes the pulse occasion hopping pattern. In some cases, the object is a UE or a mobile device.

The probing pulse signal transmitting component 615 may transmit the probing pulse signal to the object during the transmission window based on the configuration. The reflection receiving component 620 may receive the reflection of the probing pulse signal from the object during the reception window based on transmitting the probing pulse signal. In some examples, the reflection receiving component 620 may receive a reflection of the probing pulse signal from the object during the reception window based on the transmitting device transmitting the probing pulse signal.

The communication configuration updating component 625 may update a communication configuration for a device associated with the object based on the reflection of the probing pulse signal. In some examples, the communication configuration updating component 625 may select at least one device in the set of devices to communicate with the device associated with the object.

In some examples, the communication configuration updating component 625 may select transmit and receive beams for the communication between the at least one device and the device associated with the object. In some examples, the communication configuration updating component 625 may receive, from the transmitting device, a communication configuration update for the object based at least in reporting the object location information. In some cases, the device associated with the object moves with the object or remains within proximity of the object.

The probing configuration receiving component 635 may receive, from a transmitting device, a configuration for probing a location of an object, where the configuration includes a timing gap for transmission of a probing pulse signal, where the timing gap includes at least one transmission window and a reception window.

In some examples, the probing configuration receiving component 635 may identify, based on the configuration for probing the location, a time gap configuration for the timing gap, where the time gap configuration includes a starting time, a time gap duration, a transmission window duration, a reception window duration, identifiers for devices associated with probing the location of the object, or a combination thereof.

In some examples, the probing configuration receiving component 635 may identify, based on the configuration for probing the location, a probing pulse signal duration, a set of tones used for the probing pulse signal, a set of symbols or sub-symbols used for the probing pulse signal, a probing pulse signal sequence, or a combination thereof. In some examples, the probing configuration receiving component 635 may identify, based on the configuration for probing the location, a pulse time, a frequency resource location for the probing pulse signal, a spatial resource location for the probing pulse signal, or any combination thereof. In some examples, the probing configuration receiving component 635 may identify, based on the configuration for probing the location, a receive time window, where the reflection of the probing pulse signal is received during the receive time window.

In some examples, the probing configuration receiving component 635 may receive an activating signal enabling transmission of the probing pulse signal. In some examples, the probing configuration receiving component 635 may identify a pulse occasion hopping pattern for transmitting the probing pulse signal, where the configuration for probing the location of the object includes the pulse occasion hopping pattern.

In some examples, the probing configuration receiving component 635 may monitor for the reflection of the probing pulse signal according to the pulse occasion hopping pattern. In some cases, the configuration for probing the location includes a probing pulse transmission pattern. In some cases, the configuration for probing the location of the object includes an identifier for the receiving device, where the receiving device is configured to receive the probing pulse signal during the reception window based on receiving the configuration.

In some cases, the configuration for probing the location of the object includes a receive beam identifier for the receiving device, and where the reflection of the probing pulse signal is received using a beam corresponding to the receive beam identifier. In some cases, the configuration for probing the location of the object is received in a downlink control information message triggering the transmission of the probing pulse signal. In some cases, the timing gap for the probing pulse signal is aperiodic. In some cases, the activating signal is a Media Access Control element or a group common downlink control information transmission. In some cases, the timing gap for the probing pulse signal is semi-persistent.

In some cases, the configuration for probing the location of the object is received via a Radio Resource Control message. In some cases, the timing gap for the probing pulse signal is periodic. In some cases, the receiving device is a UE or a cell.

In some cases, the receiving device is configured for device-to-device communications. In some cases, the object is a UE or a mobile device. The communications suspending component 640 may suspend wireless communications during the timing gap based on receiving the configuration for probing the location of the object. The location reporting component 645 may report, to the transmitting device, object location information based on the reflection of the probing pulse signal.

The location estimation component 630 may estimate the location of the object based on an arrival latency or a reception angle of the reflection of the probing pulse signal, or a combination thereof. In some examples, the location estimation component 630 may determine the object location information based on an arrival latency or a reception angle of the reflection of the probing pulse signal, or a combination thereof.

Figure 7:
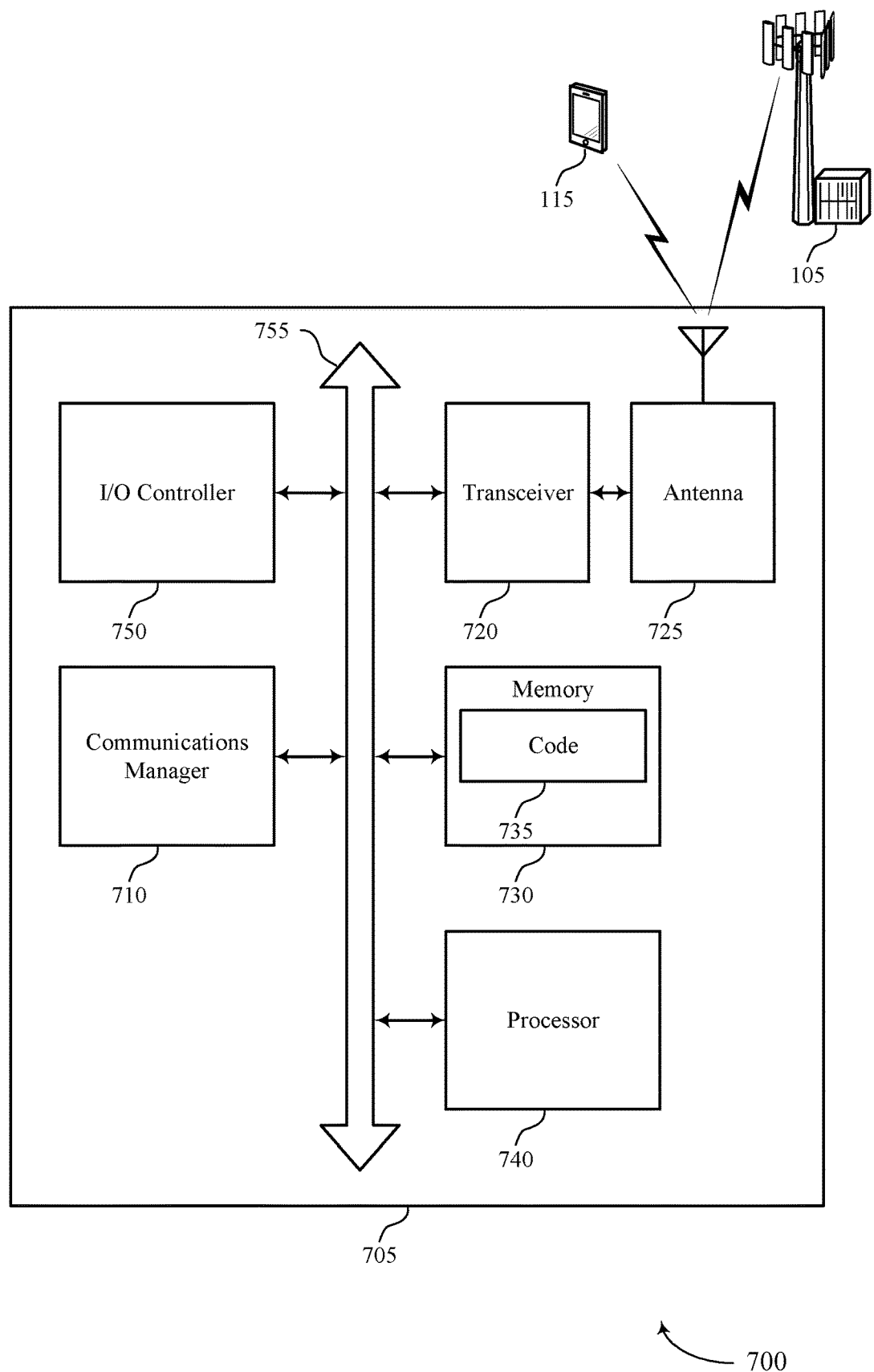
FIG. 7 shows a diagram of a system including a device that supports techniques for configuring a time gap for a probing pulse signal in accordance with aspects of the present disclosure.

FIG. 7 shows a diagram of a system 700 including a device 705 that supports techniques for configuring a time gap for a probing pulse signal in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, a transceiver 720, an antenna 725, memory 730, a processor 740, and an I/O controller 750. These components may be in electronic communication via one or more buses (e.g., bus 755).

The communications manager 710 may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmit the probing pulse signal to the object during the transmission window based on the configuration, receive the reflection of the probing pulse signal from the object during the reception window based on transmitting the probing pulse signal, and update a communication configuration for a device associated with the object based on the reflection of the probing pulse signal. The communications manager 710 may also receive, from a transmitting device, a configuration for probing a location of an object, where the configuration includes a timing gap for transmission of a probing pulse signal, where the timing gap includes at least one transmission window and a reception window, suspend wireless communications during the timing gap based on receiving the configuration for probing the location of the object, receive a reflection of the probing pulse signal from the object during the reception window based on the transmitting device transmitting the probing pulse signal, and report, to the transmitting device, object location information based on the reflection of the probing pulse signal.

Transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM, ROM, or a combination thereof. The memory 730 may store computer-readable code 735 including instructions that, when executed by a processor (e.g., the processor 740) cause the device to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for configuring a time gap for a probing pulse signal).

The I/O controller 750 may manage input and output signals for the device 705. The I/O controller 750 may also manage peripherals not integrated into the device 705. In some cases, the I/O controller 750 may represent a physical connection or port to an external peripheral. In some cases, the I/O controller 750 may utilize an operating system such as iOS®, ANDROID®, MS-DOS®, MS-WINDOWS®, OS/2®, UNIX®, LINUX®, or another known operating system. In other cases, the I/O controller 750 may represent or interact with a modem, a keyboard, a mouse, a touchscreen, or a similar device. In some cases, the I/O controller 750 may be implemented as part of a processor. In some cases, a user may interact with the device 705 via the I/O controller 750 or via hardware components controlled by the I/O controller 750.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
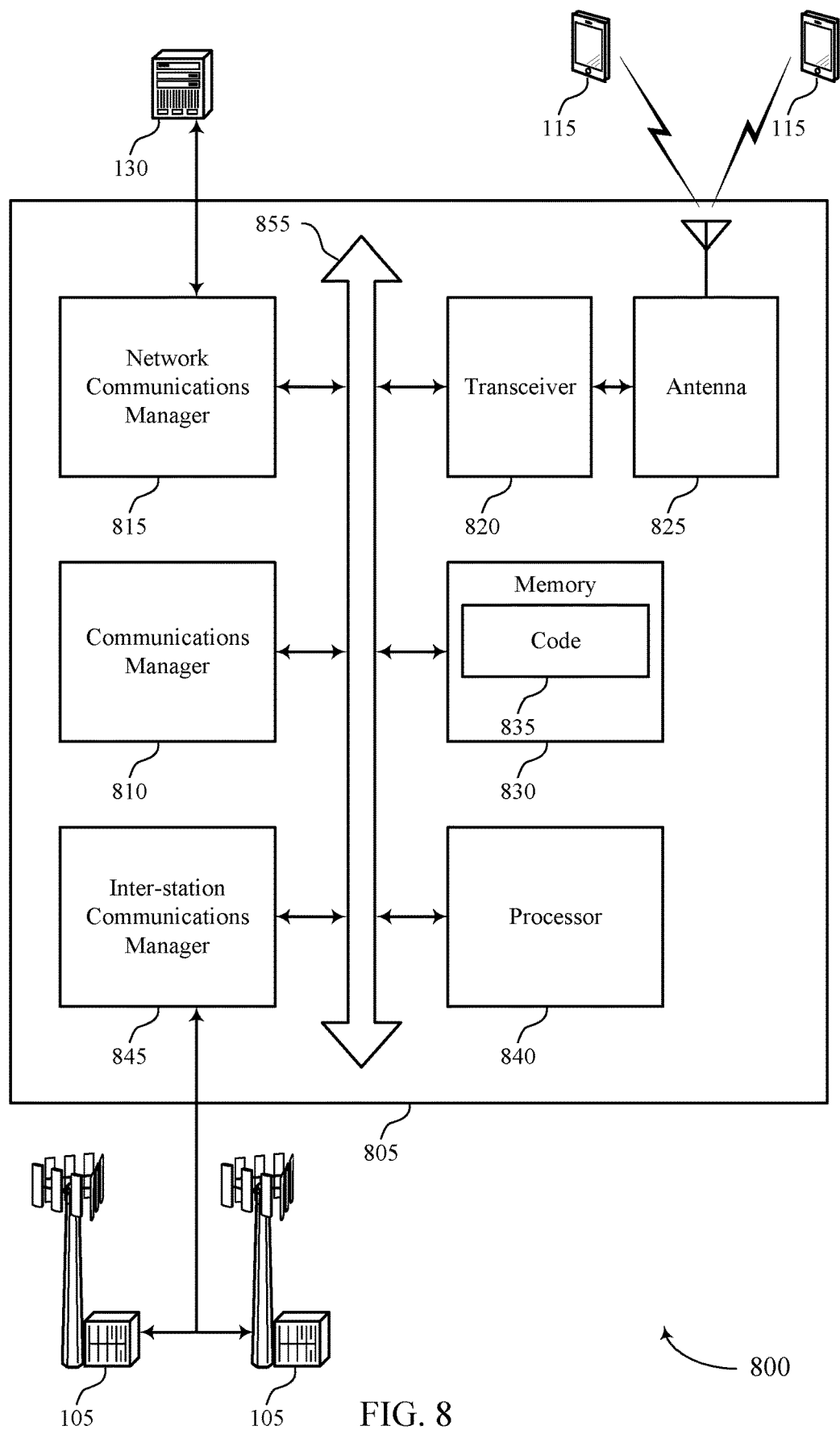
FIG. 8 shows a diagram of a system including a device that supports techniques for configuring a time gap for a probing pulse signal in accordance with aspects of the present disclosure.

FIG. 8 shows a diagram of a system 800 including a device 805 that supports techniques for configuring a time gap for a probing pulse signal in accordance with aspects of the present disclosure. The device 805 may be an example of or include the components of device 405, device 505, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 855).

The communications manager 810 may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal, transmit the probing pulse signal to the object during the transmission window based on the configuration, receive the reflection of the probing pulse signal from the object during the reception window based on transmitting the probing pulse signal, and update a communication configuration for a device associated with the object based on the reflection of the probing pulse signal. The communications manager 810 may also receive, from a transmitting device, a configuration for probing a location of an object, where the configuration includes a timing gap for transmission of a probing pulse signal, where the timing gap includes at least one transmission window and a reception window, suspend wireless communications during the timing gap based on receiving the configuration for probing the location of the object, receive a reflection of the probing pulse signal from the object during the reception window based on the transmitting device transmitting the probing pulse signal, and report, to the transmitting device, object location information based on the reflection of the probing pulse signal.

Network communications manager 815 may manage communications with the core network (e.g., via one or more wired backhaul links). For example, the network communications manager 815 may manage the transfer of data communications for client devices, such as one or more UEs 115.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for configuring a time gap for a probing pulse signal).

Inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
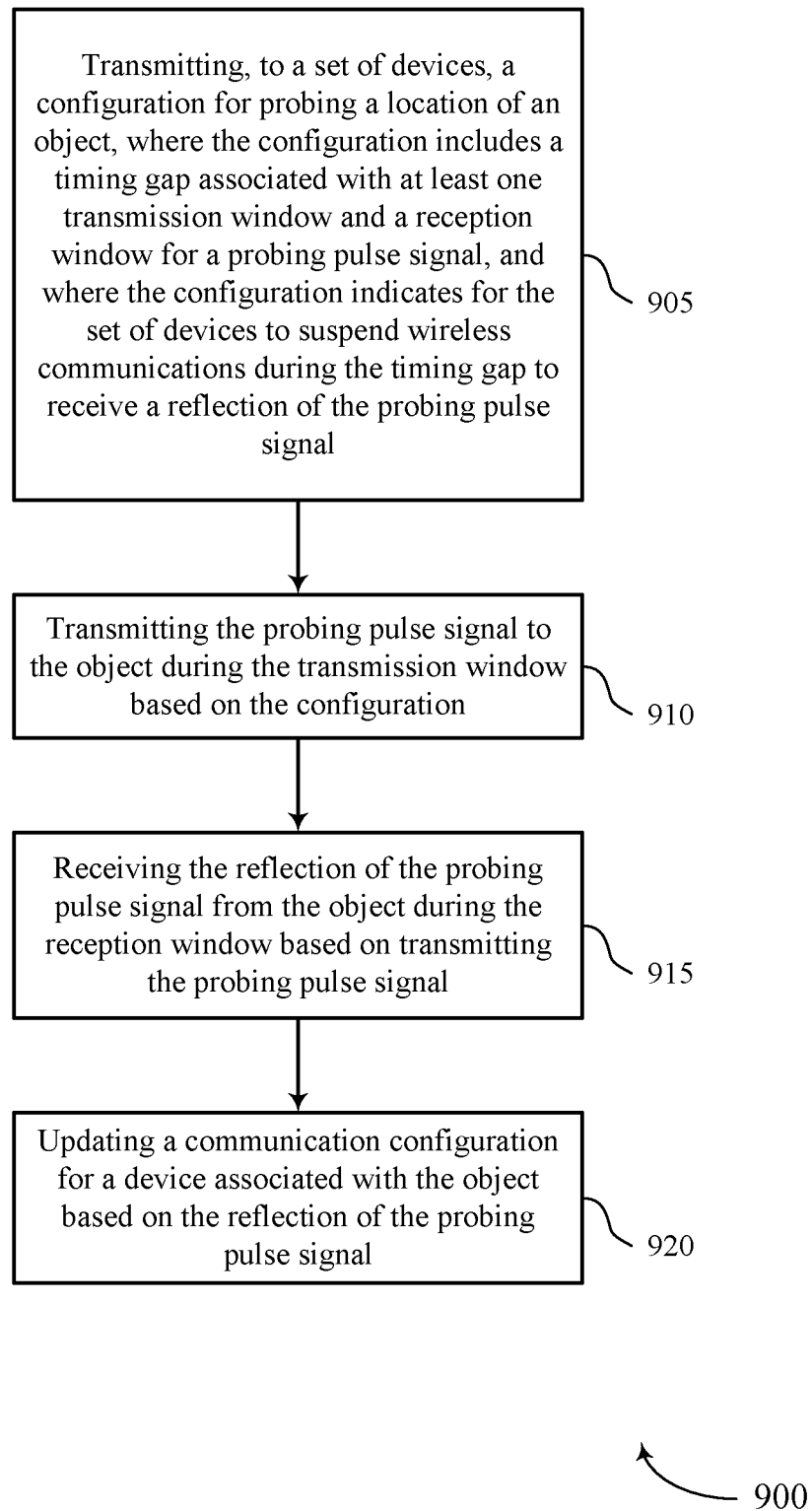
FIGS. 9 through 13 show flowcharts illustrating methods that support techniques for configuring a time gap for a probing pulse signal in accordance with aspects of the present disclosure.

FIG. 9 shows a flowchart illustrating a method 900 that supports techniques for configuring a time gap for a probing pulse signal in accordance with aspects of the present disclosure. The operations of method 900 may be implemented by a UE 115 or base station 105 (as shown in FIG. 1) or its components as described herein. For example, the operations of method 900 may be performed by a communications manager as described with reference to FIGS. 4 through 8. In some examples, a UE or base station may execute a set of instructions to control the functional elements of the UE or base station to perform the functions described herein. Additionally or alternatively, a UE or base station may perform aspects of the functions described herein using special-purpose hardware.

At 905, the UE or base station may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal. The operations of 905 may be performed according to the methods described herein. In some examples, aspects of the operations of 905 may be performed by a probing configuration component as described with reference to FIGS. 4 through 8.

At 910, the UE or base station may transmit the probing pulse signal to the object during the transmission window based on the configuration. The operations of 910 may be performed according to the methods described herein. In some examples, aspects of the operations of 910 may be performed by a probing pulse signal transmitting component as described with reference to FIGS. 4 through 8.

At 915, the UE or base station may receive the reflection of the probing pulse signal from the object during the reception window based on transmitting the probing pulse signal. The operations of 915 may be performed according to the methods described herein. In some examples, aspects of the operations of 915 may be performed by a reflection receiving component as described with reference to FIGS. 4 through 8.

At 920, the UE or base station may update a communication configuration for a device associated with the object based on the reflection of the probing pulse signal. The operations of 920 may be performed according to the methods described herein. In some examples, aspects of the operations of 920 may be performed by a communication configuration updating component as described with reference to FIGS. 4 through 8.

Figure 10:
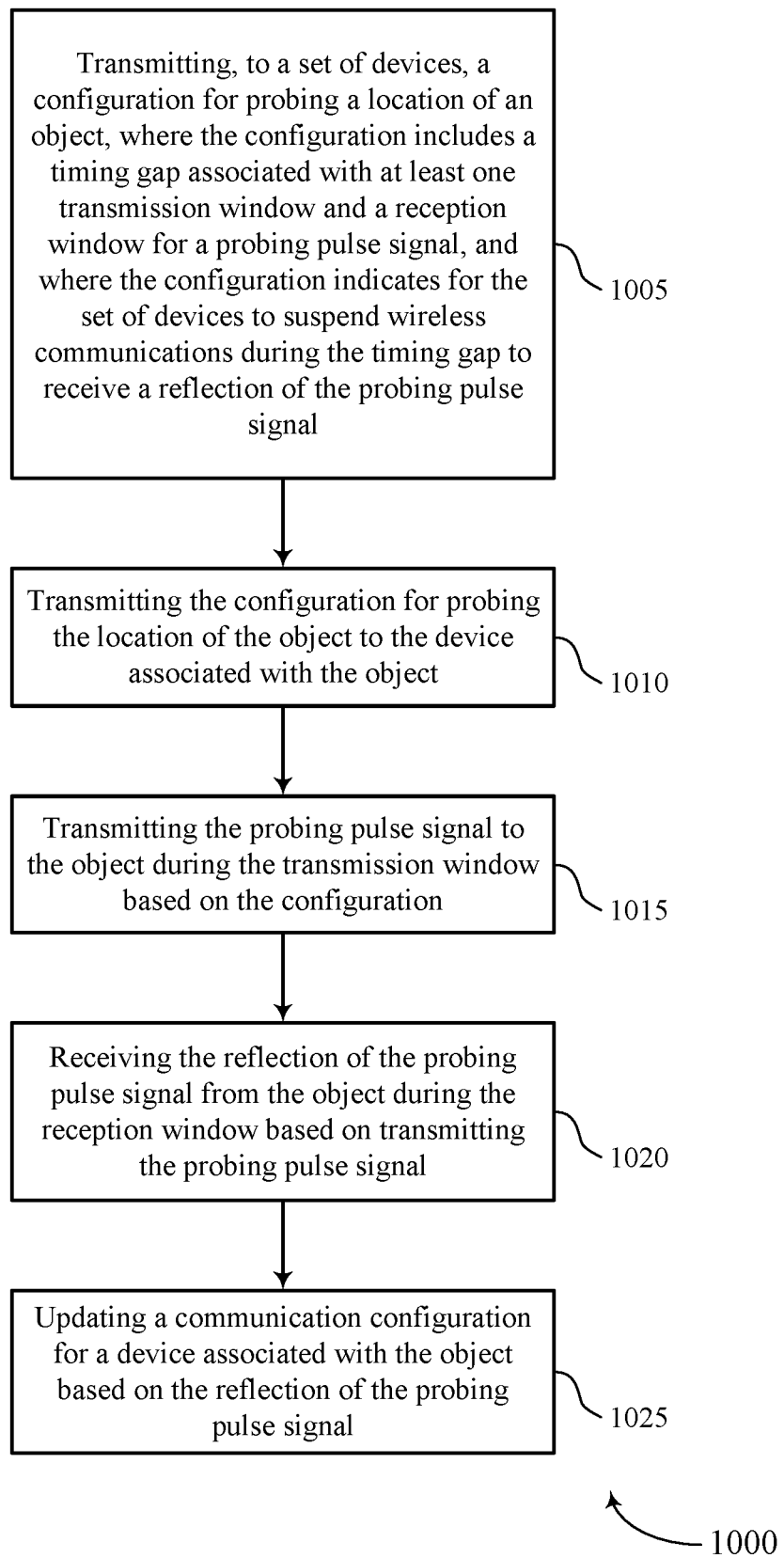

FIG. 10 shows a flowchart illustrating a method 1000 that supports techniques for configuring a time gap for a probing pulse signal in accordance with aspects of the present disclosure. The operations of method 1000 may be implemented by a UE 115 or base station 105 (as shown in FIG. 1) or its components as described herein. For example, the operations of method 1000 may be performed by a communications manager as described with reference to FIGS. 4 through 8. In some examples, a UE or base station may execute a set of instructions to control the functional elements of the UE or base station to perform the functions described herein. Additionally or alternatively, a UE or base station may perform aspects of the functions described herein using special-purpose hardware.

At 1005, the UE or base station may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal. The operations of 1005 may be performed according to the methods described herein. In some examples, aspects of the operations of 1005 may be performed by a probing configuration component as described with reference to FIGS. 4 through 8.

At 1010, the UE or base station may transmit the configuration for probing the location of the object to the device associated with the object. The operations of 1010 may be performed according to the methods described herein. In some examples, aspects of the operations of 1010 may be performed by a probing configuration component as described with reference to FIGS. 4 through 8.

At 1015, the UE or base station may transmit the probing pulse signal to the object during the transmission window based on the configuration. The operations of 1015 may be performed according to the methods described herein. In some examples, aspects of the operations of 1015 may be performed by a probing pulse signal transmitting component as described with reference to FIGS. 4 through 8.

At 1020, the UE or base station may receive the reflection of the probing pulse signal from the object during the reception window based on transmitting the probing pulse signal. The operations of 1020 may be performed according to the methods described herein. In some examples, aspects of the operations of 1020 may be performed by a reflection receiving component as described with reference to FIGS. 4 through 8.

At 1025, the UE or base station may update a communication configuration for a device associated with the object based on the reflection of the probing pulse signal. The operations of 1025 may be performed according to the methods described herein. In some examples, aspects of the operations of 1025 may be performed by a communication configuration updating component as described with reference to FIGS. 4 through 8.

Figure 11:
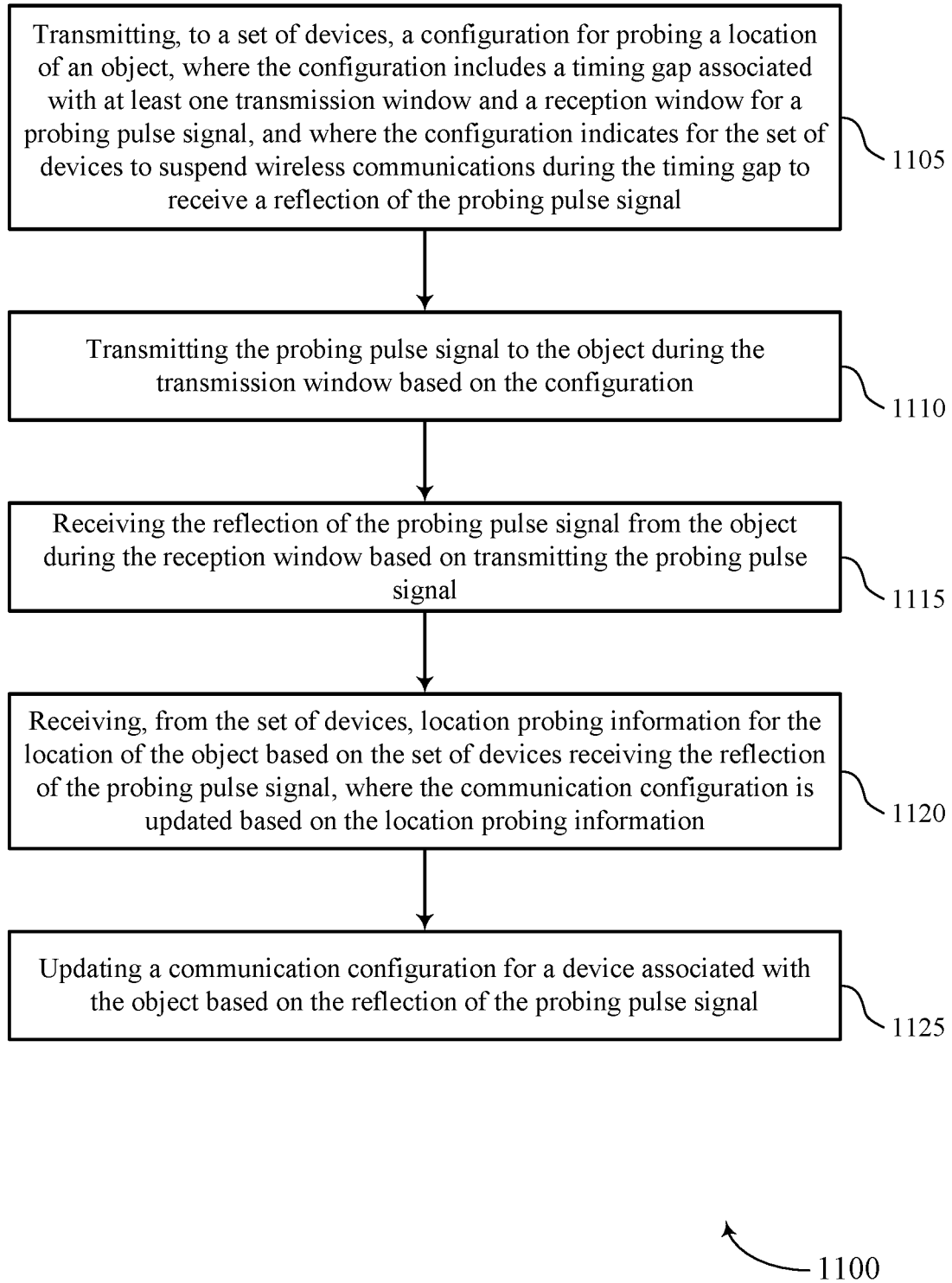

FIG. 11 shows a flowchart illustrating a method 1100 that supports techniques for configuring a time gap for a probing pulse signal in accordance with aspects of the present disclosure. The operations of method 1100 may be implemented by a UE 115 or base station 105 (as shown in FIG. 1) or its components as described herein. For example, the operations of method 1100 may be performed by a communications manager as described with reference to FIGS. 4 through 8. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may transmit, to a set of devices, a configuration for probing a location of an object, where the configuration includes a timing gap associated with at least one transmission window and a reception window for a probing pulse signal, and where the configuration indicates for the set of devices to suspend wireless communications during the timing gap to receive a reflection of the probing pulse signal. The operations of 1105 may be performed according to the methods described herein. In some examples, aspects of the operations of 1105 may be performed by a probing configuration component as described with reference to FIGS. 4 through 8.

At 1110, the UE or base station may transmit the probing pulse signal to the object during the transmission window based on the configuration. The operations of 1110 may be performed according to the methods described herein. In some examples, aspects of the operations of 1110 may be performed by a probing pulse signal transmitting component as described with reference to FIGS. 4 through 8.

At 1115, the UE or base station may receive the reflection of the probing pulse signal from the object during the reception window based on transmitting the probing pulse signal. The operations of 1115 may be performed according to the methods described herein. In some examples, aspects of the operations of 1115 may be performed by a reflection receiving component as described with reference to FIGS. 4 through 8.

At 1120, the UE or base station may receive, from the set of devices, location probing information for the location of the object based on the set of devices receiving the reflection of the probing pulse signal, where the communication configuration is updated based on the location probing information. The operations of 1120 may be performed according to the methods described herein. In some examples, aspects of the operations of 1120 may be performed by a probing configuration component as described with reference to FIGS. 4 through 8.

At 1125, the UE or base station may update a communication configuration for a device associated with the object based on the reflection of the probing pulse signal. The operations of 1125 may be performed according to the methods described herein. In some examples, aspects of the operations of 1125 may be performed by a communication configuration updating component as described with reference to FIGS. 4 through 8.

Figure 12:
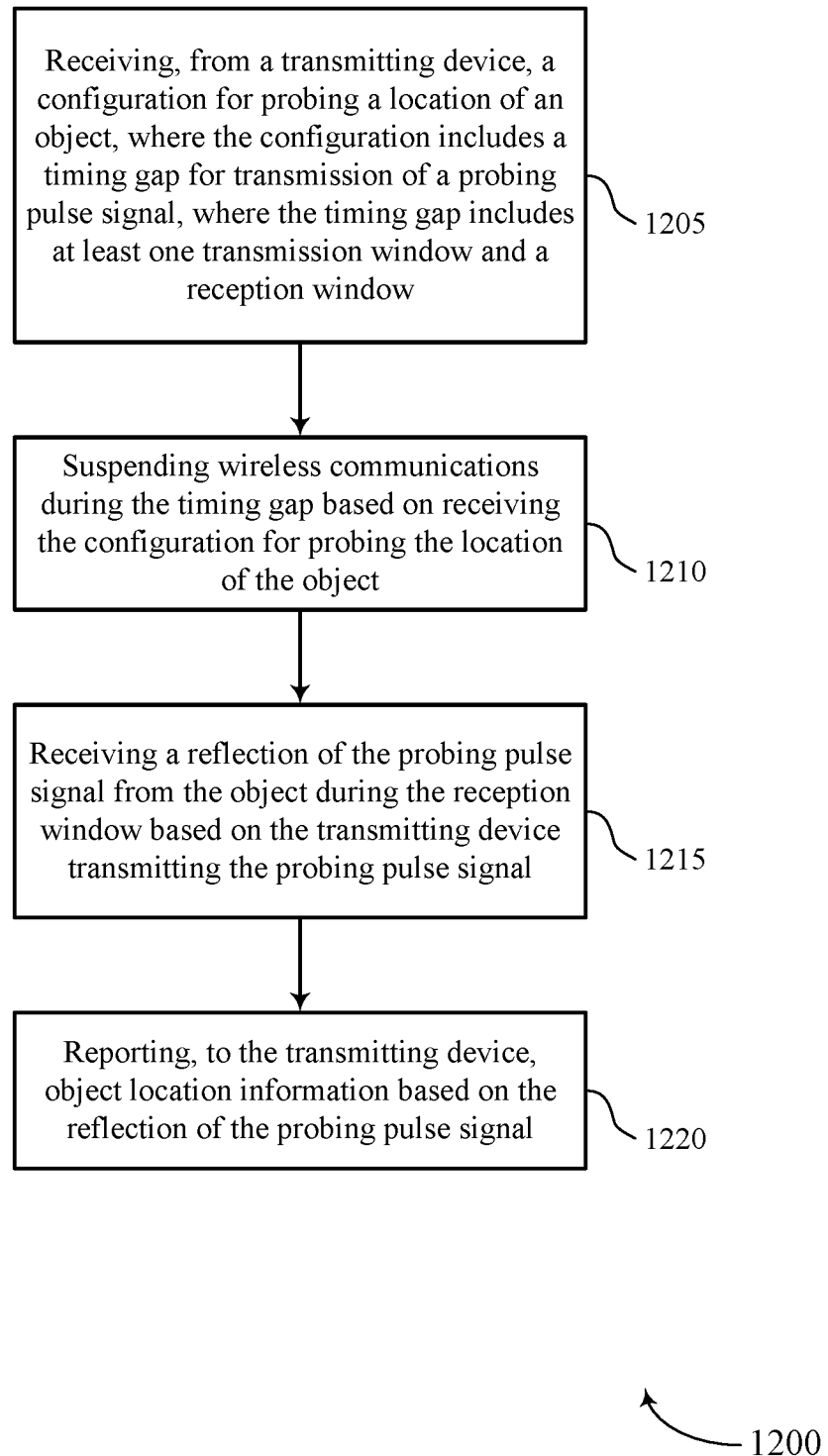

FIG. 12 shows a flowchart illustrating a method 1200 that supports techniques for configuring a time gap for a probing pulse signal in accordance with aspects of the present disclosure. The operations of method 1200 may be implemented by a UE 115 or base station 105 (as shown in FIG. 1) or its components as described herein. For example, the operations of method 1200 may be performed by a communications manager as described with reference to FIGS. 4 through 8. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may receive, from a transmitting device, a configuration for probing a location of an object, where the configuration includes a timing gap for transmission of a probing pulse signal, where the timing gap includes at least one transmission window and a reception window. The operations of 1205 may be performed according to the methods described herein. In some examples, aspects of the operations of 1205 may be performed by a probing configuration receiving component as described with reference to FIGS. 4 through 8.

At 1210, the UE or base station may suspend wireless communications during the timing gap based on receiving the configuration for probing the location of the object. The operations of 1210 may be performed according to the methods described herein. In some examples, aspects of the operations of 1210 may be performed by a communications suspending component as described with reference to FIGS. 4 through 8.

At 1215, the UE or base station may receive a reflection of the probing pulse signal from the object during the reception window based on the transmitting device transmitting the probing pulse signal. The operations of 1215 may be performed according to the methods described herein. In some examples, aspects of the operations of 1215 may be performed by a reflection receiving component as described with reference to FIGS. 4 through 8.

At 1220, the UE or base station may report, to the transmitting device, object location information based on the reflection of the probing pulse signal. The operations of 1220 may be performed according to the methods described herein. In some examples, aspects of the operations of 1220 may be performed by a location reporting component as described with reference to FIGS. 4 through 8.

Figure 13:
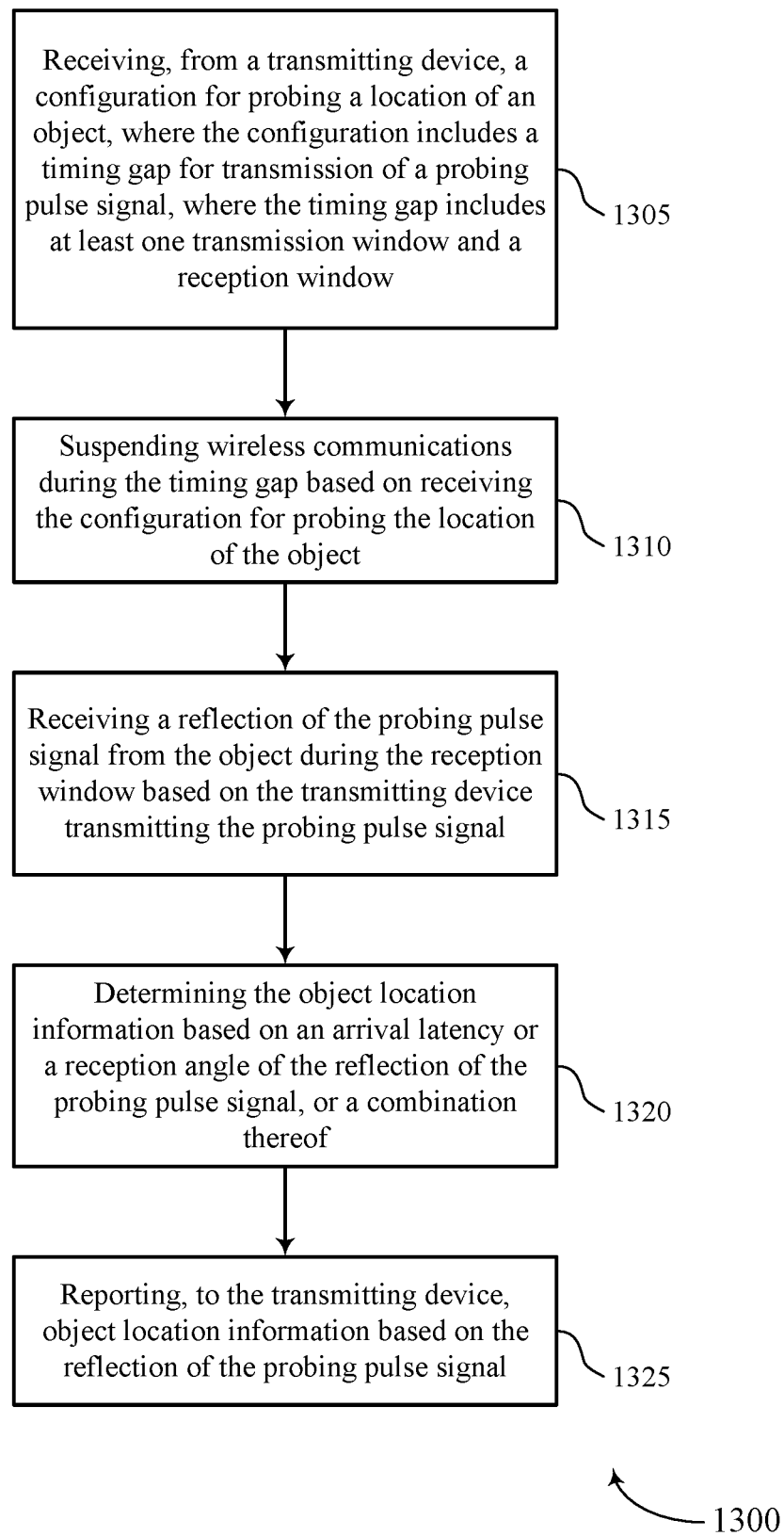

FIG. 13 shows a flowchart illustrating a method 1300 that supports techniques for configuring a time gap for a probing pulse signal in accordance with aspects of the present disclosure. The operations of method 1300 may be implemented by a UE 115 or base station 105 (as shown in FIG. 1) or its components as described herein. For example, the operations of method 1300 may be performed by a communications manager as described with reference to FIGS. 4 through 8. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may receive, from a transmitting device, a configuration for probing a location of an object, where the configuration includes a timing gap for transmission of a probing pulse signal, where the timing gap includes at least one transmission window and a reception window. The operations of 1305 may be performed according to the methods described herein. In some examples, aspects of the operations of 1305 may be performed by a probing configuration receiving component as described with reference to FIGS. 4 through 8.

At 1310, the UE or base station may suspend wireless communications during the timing gap based on receiving the configuration for probing the location of the object. The operations of 1310 may be performed according to the methods described herein. In some examples, aspects of the operations of 1310 may be performed by a communications suspending component as described with reference to FIGS. 4 through 8.

At 1315, the UE or base station may receive a reflection of the probing pulse signal from the object during the reception window based on the transmitting device transmitting the probing pulse signal. The operations of 1315 may be performed according to the methods described herein. In some examples, aspects of the operations of 1315 may be performed by a reflection receiving component as described with reference to FIGS. 4 through 8.

At 1320, the UE or base station may determine the object location information based on an arrival latency or a reception angle of the reflection of the probing pulse signal, or a combination thereof. The operations of 1320 may be performed according to the methods described herein. In some examples, aspects of the operations of 1320 may be performed by a location estimation component as described with reference to FIGS. 4 through 8.

At 1325, the UE or base station may report, to the transmitting device, object location information based on the reflection of the probing pulse signal. The operations of 1325 may be performed according to the methods described herein. In some examples, aspects of the operations of 1325 may be performed by a location reporting component as described with reference to FIGS. 4 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first wireless communication device, comprising:
    transmitting, to a plurality of second wireless communications devices, a control message indicating a timing gap for the plurality of second wireless communications devices to suspend wireless communications during the timing gap, a transmission window during the timing gap for transmission of a probing pulse signal to probe a location of an object, and a reception window during the timing gap and later than the transmission window for reception of a reflection of the probing pulse signal at one or more second wireless communications devices of the plurality of second wireless communications devices;
    transmitting the probing pulse signal to the object during the transmission window;
    receiving the reflection of the probing pulse signal from the object during the reception window based at least in part on transmitting the probing pulse signal; and
    updating a communication configuration for a device associated with the object based at least in part on the reflection of the probing pulse signal.

2. The method of claim 1, wherein the suspended wireless communications are between at least one device in the plurality of second wireless communications devices and at least one device not in the plurality of second wireless communications devices.

3. The method of claim 1, wherein the device associated with the object moves with the object or remains within proximity of the object.

4. The method of claim 1, further comprising:
transmitting the control message to the object.

5. The method of claim 1, further comprising:
transmitting the control message to the device associated with the object.

6. The method of claim 1, further comprising:
estimating the location of the object based at least in part on an arrival latency or a reception angle of the reflection of the probing pulse signal, or a combination thereof.

7. The method of claim 1, wherein updating the communication configuration further comprises:
selecting at least one second wireless communications device in the plurality of second wireless communications devices to communicate with the device associated with the object; and
selecting transmit and receive beams for the communication between the at least one second wireless communications device and the device associated with the object.

8. The method of claim 1, wherein the control message indicates a probing pulse transmission pattern.

9. The method of claim 1, wherein:
the control message indicates a set of identifiers for transmitting devices of the plurality of second wireless communications devices; and
the transmitting devices are configured to transmit additional probing pulse signals during the timing gap in respective transmission windows.

10. The method of claim 9, wherein the control message indicates transmit beam identifiers for each of the transmitting devices.

11. The method of claim 1, wherein:
the control message indicates a set of identifiers for receiving devices of the plurality of second wireless communications devices; and
the receiving devices are configured to receive the reflection of the probing pulse signal during the timing gap in respective reception windows.

12. The method of claim 11, wherein the control message indicates receive beam identifiers for each of the receiving devices.

13. The method of claim 1, further comprising:
indicating, via the control message, a time gap configuration for the timing gap, wherein the time gap configuration comprises a starting time, a time gap duration, a transmission window duration, a reception window duration, identifiers for one or more wireless communications devices associated with probing the location of the object, or a combination thereof.

14. The method of claim 1, further comprising:
indicating, via the control message, a probing pulse signal duration, a set of tones used for the probing pulse signal, a set of symbols or sub-symbols used for the probing pulse signal, a probing pulse signal sequence, or a combination thereof.

15. The method of claim 1, further comprising:
indicating, via the control message, a pulse time, a frequency resource location for the probing pulse signal, a spatial resource location for the probing pulse signal, or any combination thereof.

16. The method of claim 1, further comprising:
indicating, via the control message, a transmit beam identifier and a receive beam identifier, wherein the transmit beam identifier corresponds to a transmit beam used to transmit the probing pulse signal, and the receive beam identifier corresponds to a receive beam of a second wireless communications device of the plurality of second wireless communications devices used to receive the reflection of the probing pulse signal.

17. The method of claim 1, further comprising:
receiving, from the plurality of second wireless communications devices, location probing information for the location of the object based at least in part on the plurality of second wireless communications devices receiving the reflection of the probing pulse signal, wherein the communication configuration is updated based at least in part on the location probing information.

18. The method of claim 1, wherein the control message is transmitted via a downlink control information message triggering transmission of the probing pulse signal.

19. The method of claim 18, wherein the timing gap for the probing pulse signal is aperiodic.

20. The method of claim 1, further comprising:
transmitting an activating signal enabling transmission of the probing pulse signal.

21. The method of claim 20, wherein the activating signal is a media access control element or a group common downlink control information transmission.

22. The method of claim 20, wherein the timing gap for the probing pulse signal is semi-persistent.

23. The method of claim 1, wherein the control message is transmitted via a Radio Resource Control message.

24. The method of claim 1, further comprising:
identifying a pulse occasion hopping pattern for transmitting the probing pulse signal, wherein the probing pulse signal is transmitted according to the pulse occasion hopping pattern.

25. A method for wireless communications at a receiving device, comprising:
receiving, from a transmitting device, a control message indicating a timing gap for a plurality of wireless communications devices, including the transmitting device, to suspend wireless communications during the timing gap, a transmission window during the timing gap for transmission of a probing pulse signal to probe a location of an object, and a reception window during the timing gap and later than the transmission window for reception of a reflection of the probing pulse signal;
suspending wireless communications during the timing gap based at least in part on the control message;
receiving the reflection of the probing pulse signal from the object during the reception window; and
reporting, to the transmitting device, object location information for the object based at least in part on the reflection of the probing pulse signal.

26. The method of claim 25, further comprising:
determining the object location information based at least in part on an arrival latency or a reception angle of the reflection of the probing pulse signal, or a combination thereof.

27. The method of claim 25, further comprising:
receiving, from the transmitting device, an indication of a communication configuration update for the object based at least in part on reporting the object location information.

28. The method of claim 25, wherein the control message indicates a probing pulse transmission pattern.

29. A first wireless communication device for wireless communications, comprising:
- one or more memories storing processor-executable code; and
- one or more processors coupled with the one or more memories and operable to execute the code to cause the first wireless communication device to:
  - transmit, to a plurality of second wireless communications devices, a control message indicating a timing gap for the plurality of second wireless communications devices to suspend wireless communications during the timing gap, a transmission window during the timing gap for transmission of a probing pulse signal to probe a location of an object, and a reception window during the timing gap and later than the transmission window for reception of a reflection of the probing pulse signal at one or more second wireless communications devices of the plurality of second wireless communications devices;
  - transmit the probing pulse signal to the object during the transmission window;
  - receive the reflection of the probing pulse signal from the object during the reception window based at least in part on transmitting the probing pulse signal; and
  - update a communication configuration for a device associated with the object based at least in part on the reflection of the probing pulse signal.

30. A receiving device for wireless communications, comprising:
- one or more memories storing processor-executable code; and
- one or more processors coupled with the one or more memories and operable to execute the code to cause the receiving device to:
  - receive, from a transmitting device, a control message indicating a timing gap for a plurality of wireless communications devices, including the transmitting device, to suspend wireless communications during the timing gap, a transmission window during the timing gap for transmission of a probing pulse signal to probe a location of an object, and a reception window during the timing gap and later than the transmission window for reception of a reflection of the probing pulse signal;
  - suspend wireless communications during the timing gap based at least in part on the control message;
  - receive the reflection of the probing pulse signal from the object during the reception window; and
  - report, to the transmitting device, object location information for the object based at least in part on the reflection of the probing pulse signal.

* * * * *